(12) United States Patent
Stallman et al.

(10) Patent No.: US 9,299,049 B2
(45) Date of Patent: Mar. 29, 2016

(54) CONTRACT-BASED PROCESS INTEGRATION

(71) Applicants: Florian Stallman, Heidelberg (DE); Timm Falter, Sinsheim (DE)

(72) Inventors: Florian Stallman, Heidelberg (DE); Timm Falter, Sinsheim (DE)

(73) Assignee: SAP SE, Walldorf (DE)

( * ) Notice: Subject to any disclaimer, the term of this patent is extended or adjusted under 35 U.S.C. 154(b) by 468 days.

(21) Appl. No.: 13/838,371

(22) Filed: Mar. 15, 2013

(65) Prior Publication Data
US 2014/0278814 A1 Sep. 18, 2014

(51) Int. Cl.
*G06Q 10/06* (2012.01)

(52) U.S. Cl.
CPC .................................. *G06Q 10/0637* (2013.01)

(58) Field of Classification Search
CPC ................................................. G06Q 10/0637
See application file for complete search history.

(56) References Cited

U.S. PATENT DOCUMENTS

| | | | |
|---|---|---|---|
| 5,546,584 A * | 8/1996 | Lundin et al. .................. 719/315 |
| 7,165,036 B2 * | 1/2007 | Kruk et al. .................... 705/7.11 |
| 7,437,304 B2 * | 10/2008 | Barnard et al. .............. 705/7.15 |
| 7,487,512 B2 | 2/2009 | Brunswig et al. |
| 7,487,513 B1 | 2/2009 | Savchenko et al. |
| 7,496,624 B2 | 2/2009 | Falter et al. |
| 7,546,269 B2 * | 6/2009 | Wallace et al. ................. 705/37 |
| 7,546,602 B2 * | 6/2009 | Hejlsberg .................. G06F 9/54 717/114 |
| 7,593,889 B2 * | 9/2009 | Raines et al. .................... 705/38 |
| 7,606,818 B2 | 10/2009 | Bachmann et al. |
| 7,617,480 B2 | 11/2009 | Falter et al. |
| 7,620,934 B2 | 11/2009 | Falter et al. |
| 7,689,646 B2 | 3/2010 | Bachmann et al. |
| 7,693,973 B2 * | 4/2010 | Joseph .............. G06F 17/30017 709/223 |
| 7,694,140 B1 | 4/2010 | Sachenko et al. |
| 7,720,729 B2 * | 5/2010 | Wilce et al. ..................... 705/35 |
| 7,739,387 B2 | 6/2010 | Eberlein et al. |
| 7,751,417 B2 * | 7/2010 | Cherny et al. ................. 370/412 |
| 7,783,717 B1 | 8/2010 | Savchenko et al. |
| 7,822,826 B1 | 10/2010 | Savchenko et al. |
| 7,873,566 B1 * | 1/2011 | Templeton et al. .............. 705/38 |
| 7,933,792 B2 * | 4/2011 | Barnard et al. .............. 705/7.11 |
| 7,971,209 B2 | 6/2011 | Eberlein et al. |
| 8,010,395 B2 * | 8/2011 | Barnard et al. .............. 705/7.11 |
| 8,074,117 B2 * | 12/2011 | Wolf ................... G06F 11/0709 714/38.1 |
| 8,108,274 B2 * | 1/2012 | Johnston et al. ................. 705/34 |
| 8,204,809 B1 * | 6/2012 | Wise ............................... 705/35 |
| 8,325,750 B2 * | 12/2012 | Eugene et al. ................ 370/412 |
| 8,494,935 B2 * | 7/2013 | Sandholm et al. .............. 705/35 |

(Continued)

*Primary Examiner* — Jimmy H Tran
(74) *Attorney, Agent, or Firm* — Fish & Richardson P.C.

(57) ABSTRACT

The present disclosure describes methods, systems, and computer program products for providing contract-based process integration. One computer-implemented method includes selecting a process integration (PI) scenario definition and a desired party with which to establish communication using an interface, determining at least one semantic contract associated with the selected PI scenario definition, querying the desired party to determine familiarity with the selected PI scenario definition and the semantic contract, analyzing known contract definitions with contract usages for each determined semantic contract to generate first party analysis results, computing an intersection between the first party analysis results and corresponding received analysis results received from the desired party, determining an agreed upon set of processing types with the second party by performing an intersection with contract usage processing types exchanged with the desired party, and generating a technical specification for a message signature based upon the agreed upon set of processing types.

21 Claims, 10 Drawing Sheets

(56) References Cited

U.S. PATENT DOCUMENTS

| | | | |
|---|---|---|---|
| 8,543,511 B2* | 9/2013 | Wang | 705/59 |
| 8,645,276 B2* | 2/2014 | Wong et al. | 705/50 |
| 8,732,047 B2* | 5/2014 | Sandholm et al. | 705/35 |
| 8,838,777 B2* | 9/2014 | Almeida | H04L 41/5003 709/224 |
| 2002/0103731 A1* | 8/2002 | Barnard et al. | 705/34 |
| 2002/0111922 A1* | 8/2002 | Young et al. | 705/80 |
| 2002/0152086 A1* | 10/2002 | Smith et al. | 705/1 |
| 2002/0152133 A1* | 10/2002 | King et al. | 705/26 |
| 2003/0023527 A1* | 1/2003 | Wilce et al. | 705/35 |
| 2003/0023539 A1* | 1/2003 | Wilce et al. | 705/37 |
| 2003/0120477 A1* | 6/2003 | Kruk et al. | 704/2 |
| 2004/0049462 A1* | 3/2004 | Wang | 705/50 |
| 2004/0064386 A1* | 4/2004 | Goguen et al. | 705/34 |
| 2004/0128229 A1* | 7/2004 | Raines et al. | 705/38 |
| 2005/0027871 A1* | 2/2005 | Bradley et al. | 709/227 |
| 2005/0097046 A1* | 5/2005 | Singfield | 705/42 |
| 2005/0119905 A1* | 6/2005 | Wong et al. | 705/1 |
| 2005/0157660 A1* | 7/2005 | Mandato et al. | 370/254 |
| 2006/0015454 A1* | 1/2006 | Hahn-Carlson | 705/39 |
| 2007/0240154 A1* | 10/2007 | Gerzymisch et al. | 717/174 |
| 2008/0033878 A1* | 2/2008 | Krikorian et al. | 705/44 |
| 2008/0120129 A1* | 5/2008 | Seubert et al. | 705/1 |
| 2008/0201190 A1* | 8/2008 | Compton et al. | 705/8 |
| 2008/0215413 A1* | 9/2008 | Barnard et al. | 705/9 |
| 2008/0306755 A1* | 12/2008 | Barnard et al. | 705/1 |
| 2009/0276321 A1* | 11/2009 | Krikorian et al. | 705/17 |
| 2010/0153149 A1 | 6/2010 | Prigge et al. | |
| 2010/0153150 A1 | 6/2010 | Prigge et al. | |
| 2012/0124553 A1 | 5/2012 | Eschenroeder et al. | |
| 2012/0265744 A1* | 10/2012 | Berkowitz et al. | 707/705 |
| 2013/0110765 A1* | 5/2013 | Heidasch | 707/601 |
| 2013/0346324 A1* | 12/2013 | Wang | 705/310 |
| 2014/0006233 A1* | 1/2014 | Hamburger et al. | 705/30 |
| 2015/0154699 A1* | 6/2015 | Labuszewski et al. | 705/30 |

\* cited by examiner

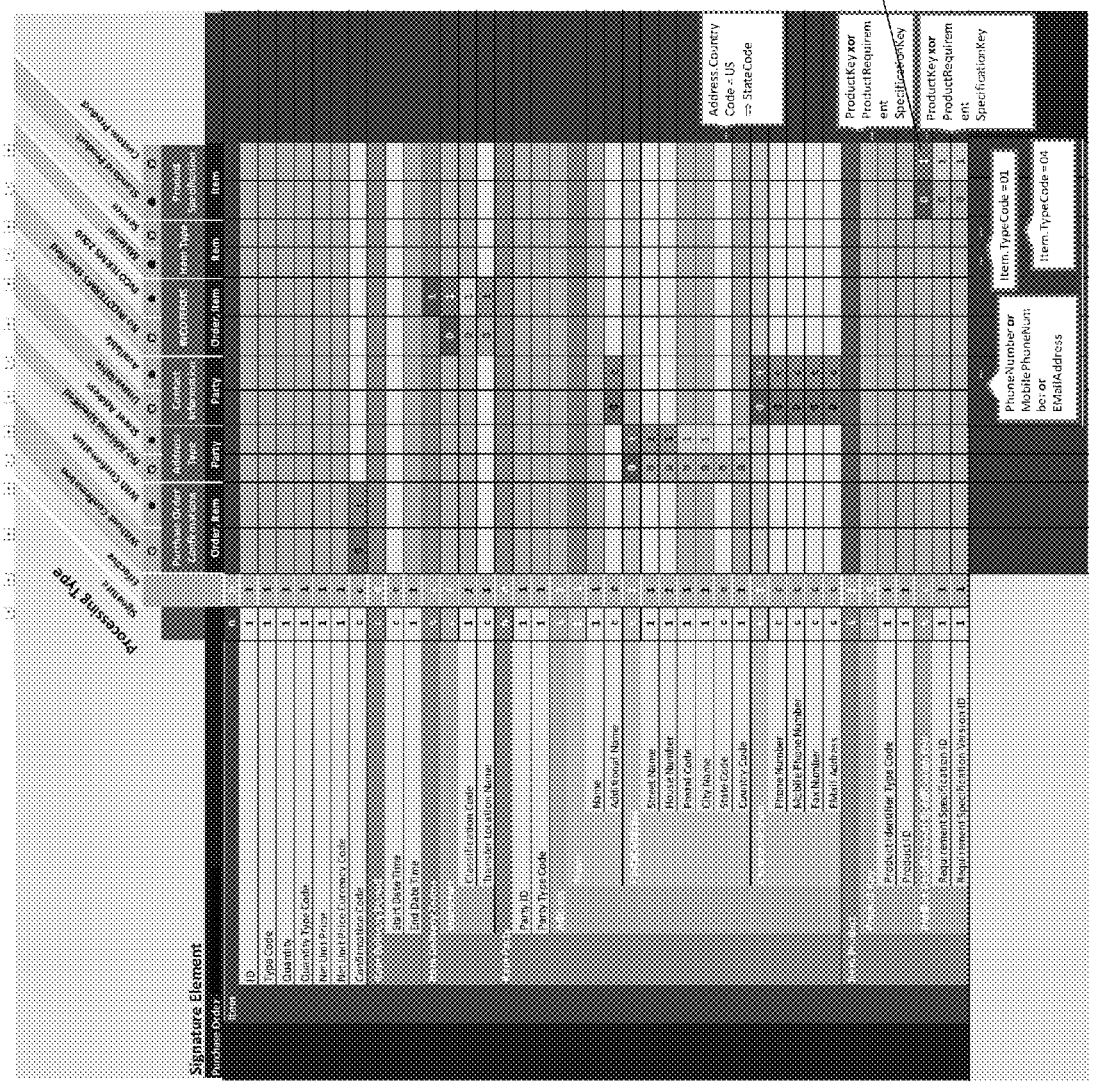

CONTRACT-BASED PROCESS INTEGRATION

BACKGROUND

In current process integration (PI) architecture, different consumer and provider systems implementing business applications, processes, tools, and frameworks use both inbound and outbound interfaces, for example web services, function calls, file uploads, and the like to provide integration between the different systems. The use of different interfaces often results in a lack of knowledge exposure for integration scenarios across different systems; insufficient business process documentation; lack of a common application programming model, configuration, and monitoring framework; lack of harmonized versioning and interface extensibility; different models, procedures, and tools across business applications; imprecise definitions of interfaces and scenarios; a lack of a defined link between inbound and outbound interfaces; and the like. As a result, total cost-of-development and total cost-of-ownership increases for both consumers and providers. This increases financial risk, loss of business, inefficiencies, the need to expend organizational resources that could be put to other productive uses, and the possibility of errors affecting the organization's financial stability and desirability.

SUMMARY

The present disclosure relates to computer-implemented methods, computer-readable media, and computer systems for providing contract-based process integration. One computer-implemented method includes selecting a process integration (PI) scenario definition and a desired party with which to establish communication using an interface, determining at least one semantic contract associated with the selected PI scenario definition, querying the desired party to determine familiarity with the selected PI scenario definition and the semantic contract, analyzing known contract definitions with contract usages for each determined semantic contract to generate first party analysis results, computing an intersection between the first party analysis results and corresponding received analysis results received from the desired party, determining an agreed upon set of processing types with the second party by performing an intersection with contract usage processing types exchanged with the desired party, and generating a technical specification for a message signature based upon the agreed upon set of processing types.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the PI scenario definition can be automatically selected based on contextual data.

A second aspect, combinable with any of the previous aspects, wherein determination of the at least one semantic contract is performed by a communication contract-aware communication framework.

A third aspect, combinable with any of the previous aspects, further comprising receiving confirmation of awareness of the selected PI scenario definition and the at least one semantic contract from the desired party.

A fourth aspect, combinable with any of the previous aspects, further comprising receiving an analysis of known contract definitions with contract usages for each determined semantic contract from the desired party.

A fifth aspect, combinable with any of the previous aspects, further comprising implementing the interface compliant with the generated technical specification.

A sixth aspect, combinable with any of the previous aspects, further comprising exchanging a message with the desired party using the implemented interface.

The subject matter described in this specification can be implemented in particular implementations so as to realize one or more of the following advantages. First, isolated, often redundant interface solutions from individual problem domains are consolidated into a homogenous overall interface. This homogeneity reduces the number of different entities that are needed to model, implement, and configure process integration (PI); reducing total cost of development. Second, a contract definition entity merges multiple entities, eliminates the need for message types, and integrates message communication profile groups/profiles. Third, PI architecture is aligned closer to standard industry practices for service-oriented architecture (SOA)/web services (WS)-based integration. Fourth, configuration of modeling entities is improved, eliminating the need for a separate set of entities in need of maintenance. Fifth, interface versioning and extensibility is more easily supported. Sixth, precision and self-documentation is possible as well-defined contracts also cover behavioral aspects and use-case dependent variability. The definitions provide information needed to create a conforming implementation and generate documentation that only covers the fields needed in a specific use case. Seventh, in the new implementation, interoperability decisions are transparent and encourage parties in cross-product scenarios to agree on a standardized specification early in the development process and force the parties to justify any subsequent changes to an agreed upon specification. Finally, more precise models allow setting up automated tests or verification of interface implementations prior to and during development. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A-3B illustrate an example contract signature and constraints for the Order operation of FIGS. 1B and 2 according to an implementation.

Like reference numbers and designations in the various drawings indicate like elements.

DETAILED DESCRIPTION

Figure 1A:
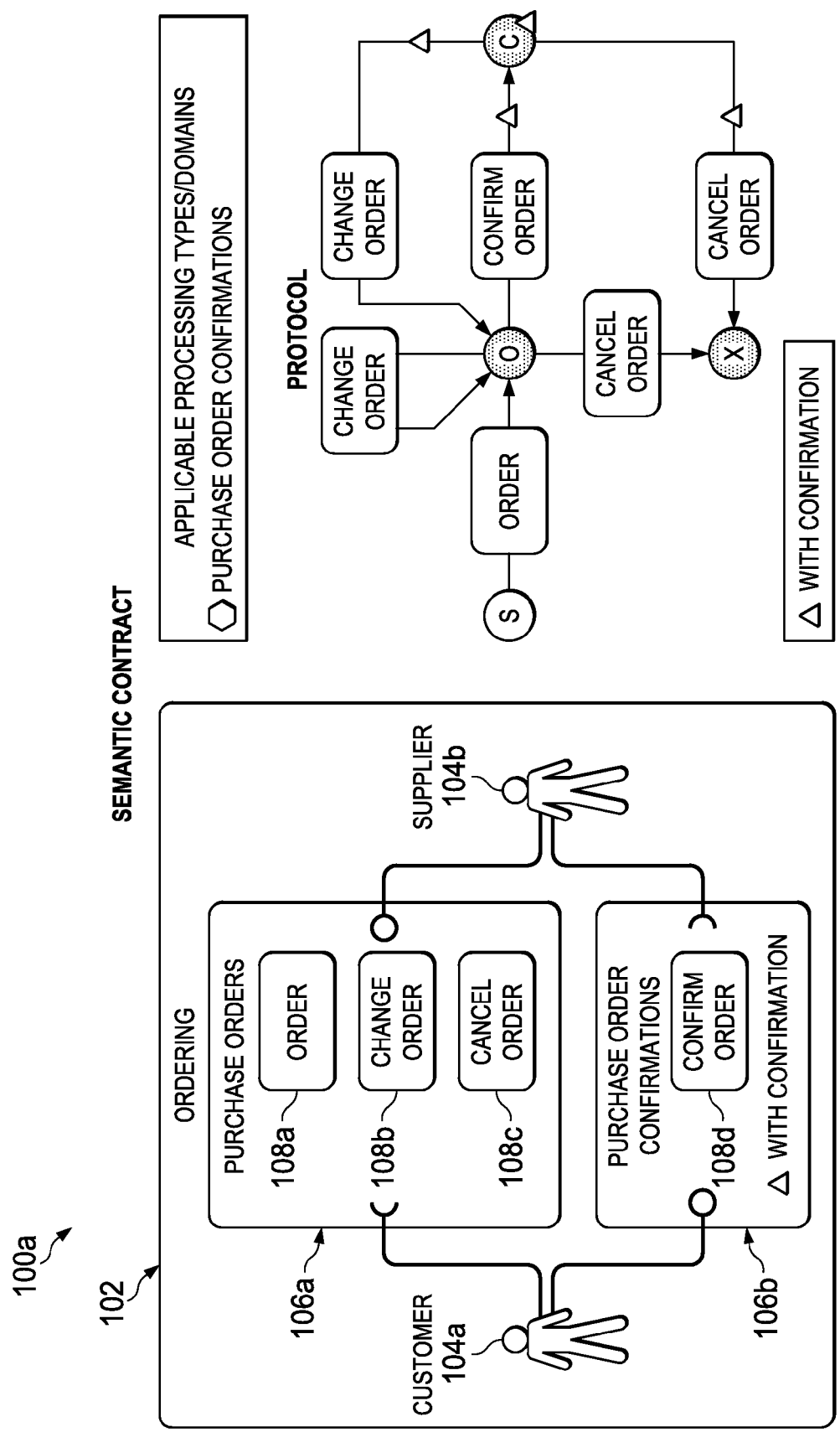
FIG. 1A illustrates an example semantic contract for handling an ordering interaction between actors according to an implementation.

This disclosure generally describes computer-implemented methods, computer-program products, and systems for providing contract-based process integration.

The following description is presented to enable any person skilled in the art to make and use the invention, and is provided in the context of a particular application and its requirements. By abandoning the concept of inbound and outbound interfaces for process integration (PI) and focusing on one interface definition on which involved parties (abstractly represented as actors) agree, a holistic solution to PI modeling, development, and configuration process can be provided. Various modifications to the disclosed implementations will be readily apparent to those skilled in the art, and the general principles defined herein may be applied to other embodiments and applications without departing from scope of the disclosure. Thus, the present disclosure is not intended to be limited to the described and/or illustrated implementations, but is to be accorded the widest scope consistent with the principles and features disclosed herein.

Contract

For every interaction between actors, for example a query and associated response, one definition of the interaction is established as binding on each actor and forms the basis for a single model of an interface for the interaction. There are no separate outbound and inbound interface models that can evolve independently. The single definition introduces detailed constraints (described below) requiring explicit definition of valid uses of the interaction. Along with defined associated interfaces and operations with their signatures, developers and customers can derive documentation in high precision from the definition. Every element of the definition is linked to enabled capabilities, making it possible to extract a very compact description covering exact capabilities required for a specific use case/PI scenario. Versioning of the definition is also possible to allow for extensions agreed upon by the actors. This modular structure is the foundation of a flexible versioning and extension concept.

Interaction patterns are groups of closely related queries/requests with their associated responses, ideal for describing business semantics, sequence and consistency constraints, usage patterns, and error handling. The interaction patterns are represented by a "contract" specifying one or multiple related interfaces with their operations and signatures (e.g., message data types) that are provided/consumed in an interaction between the actors, along with additional constraints.

In general, a contract describes an interaction between two actors by means of a set of operations, clustered into interfaces with a single shared interface definition between the actors. For each interface, actor roles are specified, for example which actor is a supplier and which is a customer. Data is transmitted according to the shared interface definition, for example in a message, regardless of how the data is manipulated locally by each actor. For example, a computer system of a customer actor has an implementation of an operation that takes data within internal data structures and translates the data into a format mandated by the contract, i.e., writes a message. The resulting message is then transmitted through an external interface by the customer's computer system to another actor's computer system (e.g., a supplier), received by an identical interface associated with the other actor's computer system, translated from the received message (i.e., read), and the read data written into internal data structures associated with the other actor's computer system. Note, operation implementations of each actor (i.e., customer and supplier) are separate and in a sense "mirror" images of each other; one implementation wrapping data into a mandated message format and transmitting the message, the other implementation receiving the message and unpacking the encapsulated data. Operation implementations cannot be simply exchanged by the actors if they wish to switch roles; internal implementations are customized to each actor with only the external interface between the operation implementations standardized. In some implementations, an interaction can be split into two or more interactions with a central "integration hub" performing a mapping of transmitted data at a technical level according to an agreed upon contract.

A contract is an atomic, indivisible entity in the sense that the interactions it describes cannot be used independently of each other in a meaningful way, for example a query-response-pattern, where neither the query nor the response can stand on its own. The principle holds for a request-confirmation-pattern as well—even though it might be feasible to use the request without the confirmation, the reverse is not true for the confirmation. Contracts are not suited to act as a generic container for all integration capabilities of a component, as these can typically be used independently of each other. Typically most contracts will contain one or two interfaces, but it is possible to create larger, logically indivisible, interface bundles. A contract also allows specifying additional constraints to document in which order/combination operations can be called, and which options or use cases exist for using a specific operation.

The concept of a contract appears in three areas: as a semantic entity (semantic contract), a definition entity (contract definition), and an implementation entity (contract usage). The division of labor between the three types of contracts is as follows: 1) a semantic contract defines what is done and what the business purpose of the interaction is; 2) a contract definition defines how the interaction should take place in great technical detail and 3) a contract usage defines who, that is which concrete software component, provides an implementation of the contract definition and is thus able to actually interact based on it, along with any imposed limitations associated with a particular implementation.

A particular semantic contract defines interfaces, operations, shared processing types (described below) and constraints (described below), but not signatures. Semantic contracts are used for specifying the intended business semantics of an interaction (e.g., when composing a PI scenario). Semantic contracts describe the interaction between at least two actors by means of a set of (semantic) interfaces, each offering a set of (semantic) operations. For each interface, it is specified which actor provides it and which one consumes it. Semantic contracts will also specify the applicable processing types with the corresponding constraints. In other words, a semantic contract is a specification of the interaction between two abstract parties at the business logic level by means of a conceptually inseparable set of abstract interfaces and operations, and constraints governing their use. It is a conceptual entity that abstracts from implementation aspects such as product, version, or technology. As such, it can serve as a bracket, abstraction, handle, or placeholder entity that subsumes all implementations with identical business semantics and allows addressing them in a transparent, unified, product-, version-, and technology-agnostic way. The focus is on exposing an integration need or capability of the system in a specific business context, while providing maximum flexibility with respect to the way it is implemented. For purposes of this application, a business layer is implementation independent, an engineering layer is implementation dependent, and the implementation layer is a technical realization. Semantic contracts can serve multiple purposes: in the software-independent business layer, they allow specifying integration requirements in a systematic manner, as opposed to a purely textual description. In the implementation layer, semantic contracts provide a bracket entity that allows grouping multiple alternative technical realizations or successive versions of the same interface. This is useful at configuration-/deployment-time (and possibly runtime) because it is a cornerstone of an efficient system for meeting conceptual integration requirements by automatically matching and activating compatible implementations and thus avoiding a combinatorial explosion.

A contract definition (of the particular semantic contract) lists relevant processing types and then specifies which operations, call sequences, and subsets of the operation signatures are required or forbidden for each processing type. A contract definition is a specification of the interaction between two abstract parties by means of a conceptually inseparable set of interfaces, operations, and operation signatures, and constraints governing their use. The contract definition is a central entity of the proposal, fully implementing the contract concept in the implementation layer. A contract definition is a concrete entity in the sense that it provides a complete specification in full technical detail. However, it is still abstract in the sense that the contract itself is not a piece of software—it is a definition, i.e., a specification, not an implementation, and as such is neither executable nor specific to a single product version.

A contract usage (not illustrated for the examples in this disclosure) is a model entity documenting that a specific set of implementation artifacts represents a full or partial implementation of a contract, along with the specific restrictions that may apply to the implementation. A contract usage documents how a product implements a contract definition. When product, such as a business application, implements one side of the contract definition, the implementation is documented by means of a light-weight model entity called a contract usage. The contract usage points to both the contract definition and corresponding implementation artifacts. If the product only implements a subset of the capabilities defined by the contract definition, the implementation is publicized by explicitly including only the supported processing types in the contract usage. A contract usage object is not an actual, technical implementation, nor does it contain any coding. The contract usage is merely a light-weight association or correspondence object, pointing to the contract definition on one side, and relevant technical entities on the other side.

It is desirable that semantic contracts should be maintained in one central location (e.g., integrated into and published in a central 'catalog') and shared across an entire organization as the need for new semantic contracts is motivated locally.

Contract usages are hybrid entities containing a private and a public part; created locally as they document that a specific (local) implementation implementing a specific contract definition. Information about interfaces and operations that are implemented and the constraints concerning supported processing types are public information that is made available to other systems to make the capabilities of an implementation known and enable automated configuration and adaptation. The contract usage also contains links to internal implementation entities that document how it is realized that are private and do not need to be published to other systems.

FIG. 1A illustrates an example semantic contract 100a for handling an ordering interaction between actors according to an implementation. The ordering semantic contract 100a includes semantic contract "Ordering" 102, associated applicable processing types/domains 110 (e.g., "Purchase Order Confirmations") and a protocol 112 with various transitions restricted/constrained by processing type "With Confirmation" (described more fully below). In this example semantic contract, a customer actor 104a could generate a purchase order while supplier actor 104b processes the received purchase order as a sales order. One interface, for example "Purchase Orders" 106a, could handle purchase orders and offer operations to order 108a, change order 108b, and cancel order 108c; and another interface, for example "Purchase Order Confirmations" 106b, could handle purchase order confirmations by offering a single operation for confirming an order 108d.

Figure 1B:
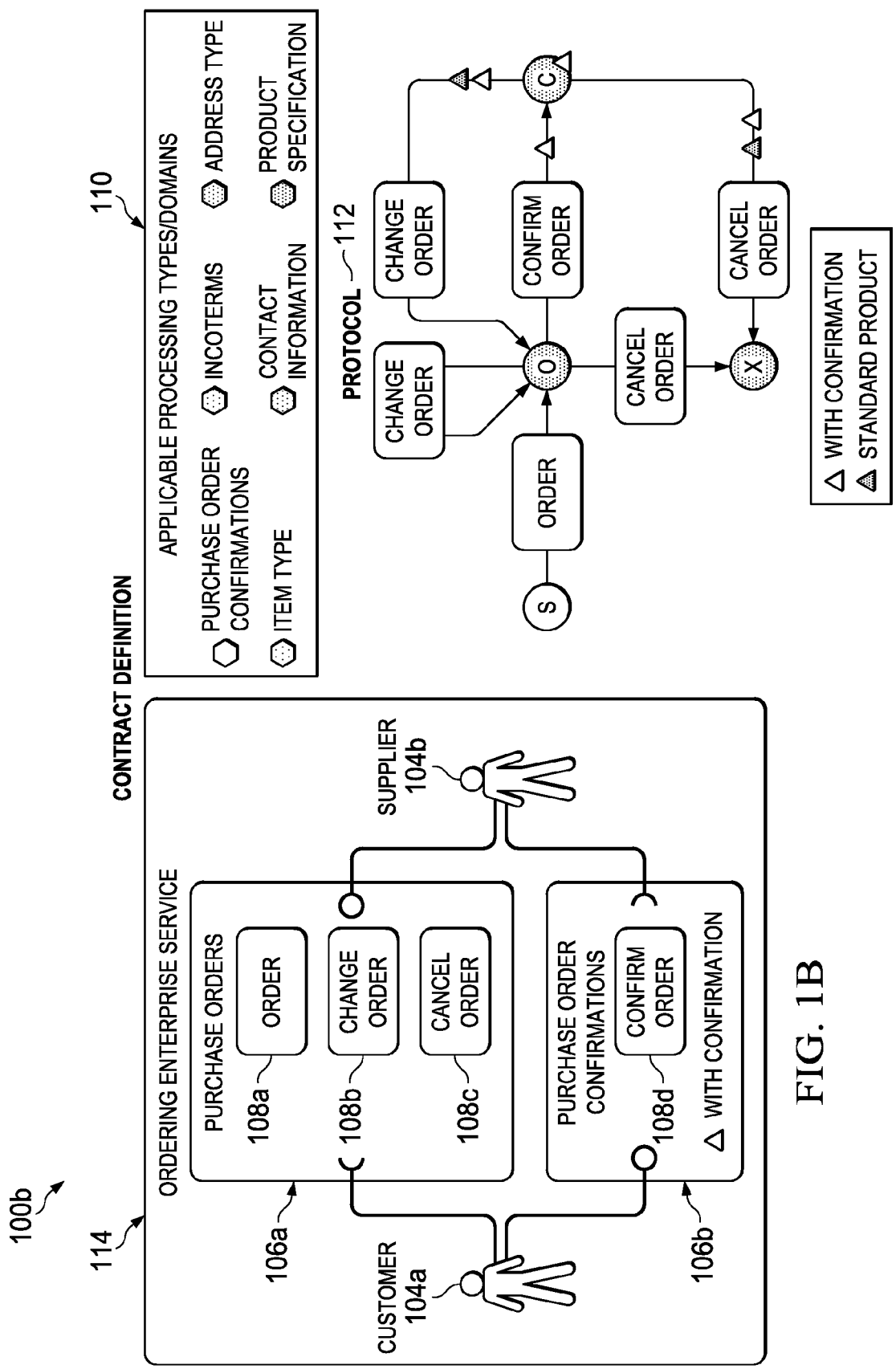
FIG. 1B illustrates an example contract definition of the semantic contract of FIG. 1A for handling an ordering interaction between actors according to an implementation.

FIG. 1B illustrates an example contract definition 100b of the semantic contract of FIG. 1A for handling an ordering interaction between actors according to an implementation. The contract definition 114 "Ordering Enterprise Service" fully implements semantic contract 102 of FIG. 1A in the engineering layer and is a concrete entity in the sense that it provides a complete specification (e.g., a complete signature) in full technical detail of the semantic contract 102 "Ordering" of FIG. 1A. It is provided a name, "Ordering Enterprise Service" to indicate it is a specific implementation of a semantic contract associated with a specific technology. As illustrated, contract definition 114 is associated with applicable processing types/domains 110 and a protocol 112 with various transitions further restricted/constrained by processing types "With Confirmation" and/or "Standard Product" (each described more fully below).

Actor

Contract actors, for example actors 104a and 104b illustrated in FIG. 1, abstractly represent two sides of an interaction and are typically realized by any suitable software entity.

Each actor definition is meant to be local to a contract in which it is defined and has no semantics beyond the boundaries of the contract. Actor labels, for example "Customer"/ "Supplier," establish a context of an interaction by providing an idea of who is interacting and which side of the interaction is doing what, for example that the Purchase Order Confirmations interface 106b is provided by the Customer actor 104a. In most implementations, due to the reusable nature of a contract, actors should not reference concrete components or try to characterize possible implementers beyond stated integration requirements—that is, any component that implements an interface is acceptable and can act the part of the corresponding actor.

Interface

At a high level, an interface is a single shared specification associated with a contract that defines a set of operations that the provider of the interface exposes and that any conformant actor/caller can invoke and receive data from. An interface is directional in the sense that actors, for example a customer and a provider, are clearly distinguished for each specific use of an interface, and that each component provides and requires a well-defined set of interfaces.

At the implementation level, a physical implementation of the interface exists for each opposite side of an interaction. The service provider realizing the interface will provide an implementation that can actually be called (inbound), whereas the service consumer will still need an implementation encapsulating the code necessary for composing a conformant request to the corresponding implementation on the other side (outbound). It is therefore not primarily the implementation that changes, but the description and technical identifiers. For example, for web services, there will only be one agreed WSDL definition with a single technical name referenced by both parties, removing the potential for (name) matching and WSDL equivalence problems.

In typical implementations, contract interface operations are inseparable and semantically linked, e.g., in a query/response, request/confirmation, or notification pattern. Interface definitions exist primarily for user convenience to group/identify linked operations. Generally, interfaces should be used to cluster closely related operations, for example all dealing with the same business document ("object") or all operations required in a specific phase of an interaction. As a result, the specific purpose of the contract can act as an upper bound on the size of associated interfaces.

While there is only one interface type and no distinction between inbound and outbound interfaces, a contract does differentiate between actors (e.g., "provider" and "consumer") of an interface, which must be unambiguous. An asynchronous exchange, for example one consisting of a query and a response, requires at least two interfaces, one for the query and one for the response, or at least one interface per direction.

The relationship between an interface and contract is a composition. Therefore, an interface is not reused across contracts. Nonetheless, building blocks of contracts can be reused, in particular at the implementation level. This is particularly true if contract models are created on top of existing interface implementations.

At a technical level, an interface is implemented by various combinations of coding, web service endpoints, WSDLs, components, process agents, mapping engines, and the like.

Operation

Operations associated with an interface are atomic and callable in isolation. However, different software methodologies/technologies have different conceptions about what constitutes an operation and operations can be implemented in a myriad of ways. While design/types of operations should generally be driven by business semantics, contract definitions can merge or split operations defined in a semantic contract, for example by requiring the consumer to call a series of technical operations to achieve one business purpose, by reusing the same technical implementation (e.g., one form for "Create" and "Change"), and/or by treating an operation as a special case of another (implementing "Cancel" as a change to quantity=0).

Typically there is a single semantic contract for an interaction such as invoicing a customer. Such an interface will then be implemented by different products (e.g., business applications), often multiple times per product using different technologies.

At an operation level, typically each contract definition operation realizes one or more semantic operations. In some implementations, each operation will implement exactly one semantic operation. However, in other implementations, and depending on the chosen granularity of the semantic operations, operations can group multiple semantic operations. For example, form-based interfaces can reuse the same operation for creating and updating an object. As another example, multiple different types of notifications can be semantically distinguished, but a single notify operation can implement the different types. In some implementations, multiple semantic operations can become intrinsic processing types of a concrete operation. In some instances, a synchronous operation can state that it implements both a request and a response semantic operation.

In some implementations, a semantic operation that is semantically indivisible can be (e.g., for technical reasons) spilt up into multiple operations. In this case, the fact that the operation is a fragmentary implementation of the concept, and which other technical operations need to be called is recorded.

Constraints (described below) can affect the relationship between operations and their semantic counterparts. For example, depending on a chosen processing type, a semantic operation "Cancel" can, in the same contract, either be executed by using a dedicated "Cancel" operation, or by using a "Change" operation with processing type (described below) "Cancel" set to ACTIVE, which can result in setting a requested quantity value to zero (indicating a Boolean FALSE/cancel value). This use of constraints and processing types can be useful when integrating/implementing contracts with different products where one may use the "Cancel" operation and one uses the "Change" operation but similar functionality is needed.

Signature

Each operation in a contract definition defines a signature using a data type definition containing a structure definition enhanced with additional restricting constraints. The signature defines what structures and fields need to be provided in a message transmitted between operation interfaces.

Constraints

A constraint is any arbitrary Boolean expression, i.e., any expression that can be evaluated to a TRUE/FALSE valued response. Constraints control the validity/existence of static and dynamic properties of a contract, i.e., which structural elements (operations or signature elements) are available or required, or which actions and state transitions are allowed under specific circumstances. The most common uses of constraints are to make operations or entire interfaces conditionally required, doing the same for elements of operation signatures, and constraining the protocol.

Constraint expressions can range from simple to complex logical, mathematical, or textual formulae. Processing types figure prominently in constraints, but are themselves dependent on and derived from configuration data, master data, or the content of concrete message instances.

A contract constraint element is used for storing both signature and cross-element constraints. Additionally, this element can also be used to store 'weak' constraints that express recommended defaults and non-structural constraints, e.g., which side is expected to perform ID mapping (should it be necessary). The constraint element can also store textual constraints for documenting restrictions that cannot be formalized using expressions, or that have not been formalized.

Constraints operate on a type or instance level, both of which are interdependent. Enablement conditions for operations operate on the type level—if the operation is required, it needs to be developed, deployed, and configured, but there is no requirement for the user to actually call it. A contract protocol (described below), on the other hand, constrains the instance level—for example, if the contract protocol requires a call sequence of X, Y, Z, the user must call Y before calling Z.

Processing Types

A processing type is an operative or controlling property of a process chain or use case instance. It is operative, i.e., causing an effect, in the sense that it affects the behavior of the software, controlling process step transitions, service invocations, UI adaptations, or object behavior. Processing types document in a unified manner "switches" that have a significant effect on overall product and are based on two central ideas: 1) distilling an outcome that is relevant for subsequent processing into a simple binary decision. For example, is an approval step required (Approval required/Approval not necessary)? Specifying that a particular decision exists, where it is taken, what the possible outcomes are, and which further behaviors are affected by this decision is very useful information, even if the specific mechanisms and implementations are not known. The decisions can be used to increase the transparency and expressiveness of many models, in particular process flow and process integration models; and 2) the ability to derive any relevant decision that is not based on direct user input either from instance data, master data, or configuration data.

Processing types affect process integration as they represent decisions that can significantly affect the process behavior, which interactions are necessary, and what is communicated. Process types can also be deduced from object properties. For example, a specification could indicate how process types are configured or how they can be recognized in an incoming message. Processing types allow formalizing different supported use cases by using the processing types as arguments in various types of constraint expressions.

Processing Type Domains

A processing type domain is the declaration of a derived named property of an instance entity, complete with a list of allowable values that has an effect on the behavior of the entity. Processing type domains represent significant properties or decisions that control or affect the behavior of the software. Processing types are organized into processing type domains. In some implementations, each processing type domain is dedicated to a specific topic and contains a list of mutually exclusive processing type alternatives. For example, a Sales Order Item can have a processing type domain called "Item Product Type" with processing types such as "Material" or "Service." The determination rule for this decision is trivial, as the mutually exclusive determination of the applicable processing type can be taken directly from a product definition (e.g., whether the item is an "ABC Widget" (material) or "Production Equipment Service Plan" (Service)) and can be used to drive process functionality (e.g., only for a "Material" processing type would a logistics component be notified of the customer requirement).

Not all processing type domains are equally important or have the same impact on a contract. Their role in the contract can thus be classified in various ways. Firstly, which aspects of a contract are affected can be specified including the following: scope (which interfaces/operations are included), sequence (what is the usage protocol for calling them), signature (which structures and fields need to be provided) or semantics (what do specific fields mean, e.g., which side needs to convert an ID). Secondly, a processing type domain can be extrinsic or intrinsic to a communication. If it is intrinsic, the active value can be determined based on the content of an actual message (e.g., because a certain field is missing). If it is extrinsic, a message cannot be understood properly without additionally knowing the active value (e.g., who needs to map an ID).

Processing type domains can also be classified as static (fixed at configuration time) or dynamic (fixed at run time). For each processing type of a static processing type domain, the infrastructure will generate physical interfaces, i.e., WSDLs and endpoints in the case of web services. When setting up a connection, interacting parties will agree on the processing types that should be used for a static domain. Dynamic domains can be restricted in the configuration process as well, but the exact processing type only becomes fixed at runtime.

Contract Protocols

A contract can, at an application level, constrain an allowed sequence or choreography of operation invocations by means of state machine/chart models called contract protocols. Contract protocols specify all possible allowed sequences of operation invocations by defining states and transitions between them that represent the corresponding operation invocation. Transitions in a contract protocol can be conditional. For example, they can depend on processing types or because operations can themselves be optional at runtime. Constraints can also refer to the contract protocols of other, related contracts in order to allow expressing constraints for an overall choreography, for example a situation where a law states that an invoice should not be sent before an outbound delivery. Because contracts are by definition independent of each other, such cross-contract constraints are conditional and typically only come into effect when the contracts are actually used in conjunction with each other and a matchup can be made between the contracts (e.g., invoice/delivery notifications references similar order identifications).

Contract protocols can provide multiple benefits. Apart from a documentary value, they enable automated testing of implementations by iterating through different allowed sequences and verifying that reactions conform to associated specification. Contract protocols can also serve as the basis for model derivations if the contract protocol is defined before an implementing object is designed. In some implementations, contract protocols can be automatically generated from sequence diagrams, process flows, and other suitable data structures, such as UML sequence diagrams.

Figure 2:
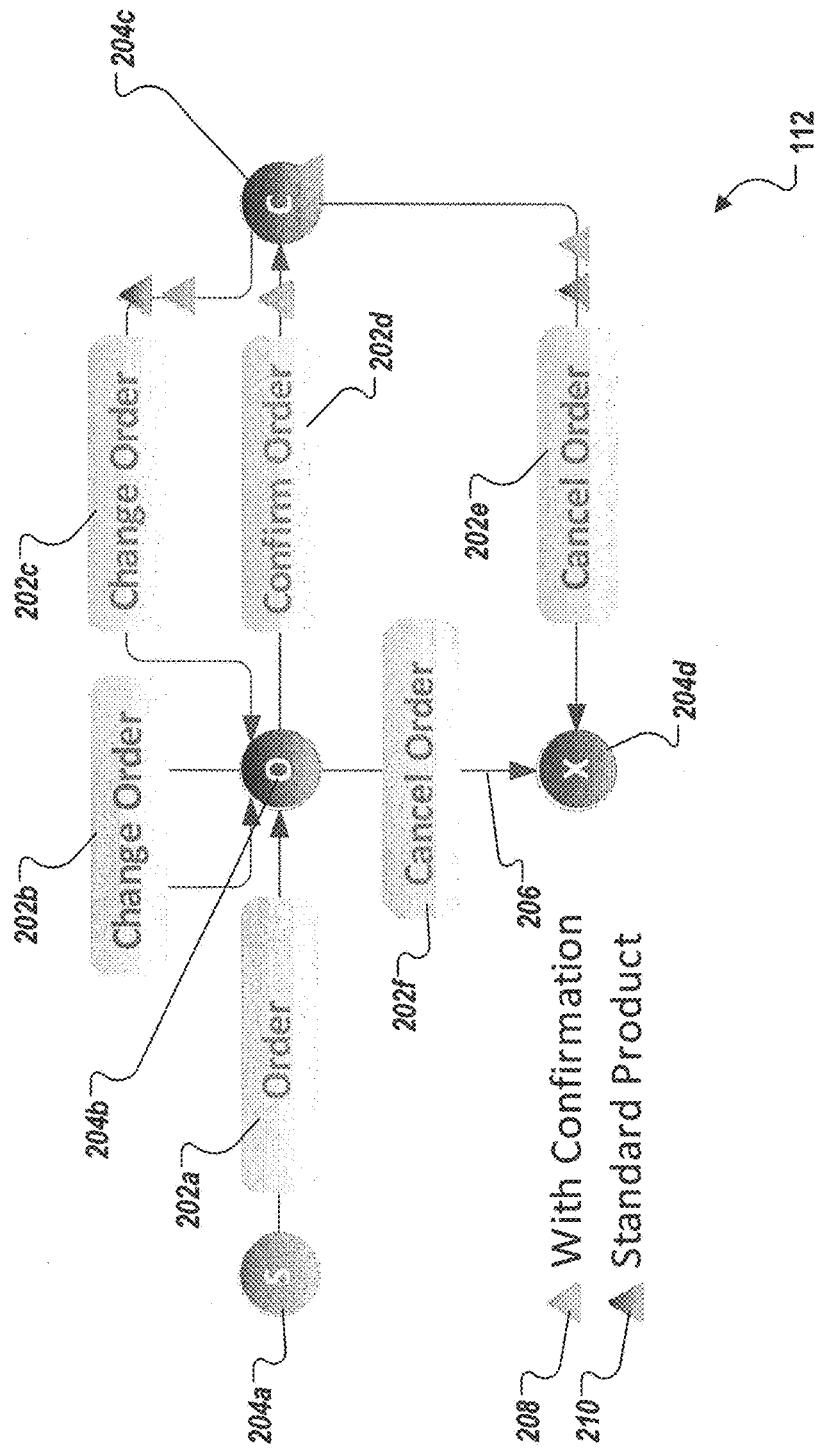
FIG. 2 illustrates an example contract protocol associated with the example ordering contract of FIG. 1 according to an implementation.

FIG. 2 illustrates an example contract protocol 112 associated with the ordering contract 100 of FIG. 1. Those of skill in the art will appreciate that the provided example notation is one of a multitude of possible ways to indicate/describe a contract protocol. For example, unified modeling language (UML) could be used where states are boxes with names spelled in full and operations are text identified on transition arrows. It is envisioned that any suitable notation method to illustrate underlying concepts is within the scope of this disclosure. In the example notation, operations, for example "Order" and "Cancel Order," are indicated by 202a-202f. States, for example "S"—Start, "O"—Ordered, "C"—Confirmed, and "X"—Cancelled, are indicated by 204a-204d respectively. In the example notation, transitions are indicated by directional arrows, for example, transition 206, indicating that flow in the contract protocol moves in the direction of the arrow. Flow is indicated as moving from operation "Cancel Order" 202f to state "X"-Cancelled 204d. State 204a is considered a "start" state, state 204d is considered a "terminal" state, and states 204b/204c are considered "transitional" states. In the example contract protocol 200, is always possible to change or cancel an order once it has been first ordered, no matter whether it has been confirmed or not. However, after cancelling, it can never be resurrected. AS indicated in the example, the transitions and states constrained with the yellow and blue triangles are only allowed when using a processing type, for example "With Confirmation" 208 and "Standard Product" 210, respectively. Processing types allow formalizing different supported use cases by using the processing types as arguments in various types of constraint expressions. Ideally, for a given configuration of active processing type values, it is possible to derive a choreography and set of signatures for a contract that contains no alternatives and only optional fields with a supplementary or documentary character.

For a protocol transition, a condition is enabled if an associated transition expression evaluates to true, and disabled if it evaluates to false. The same is true for conditionally enabled interfaces and operations—it is possible to assign an expression that defines that the interface/operation is only included if a certain (combination of) processing type(s) is active. In some implementations, it is necessary to include the effects of a condition into the expression itself and store it independently from the entity that is being constrained.

Figure 3A:
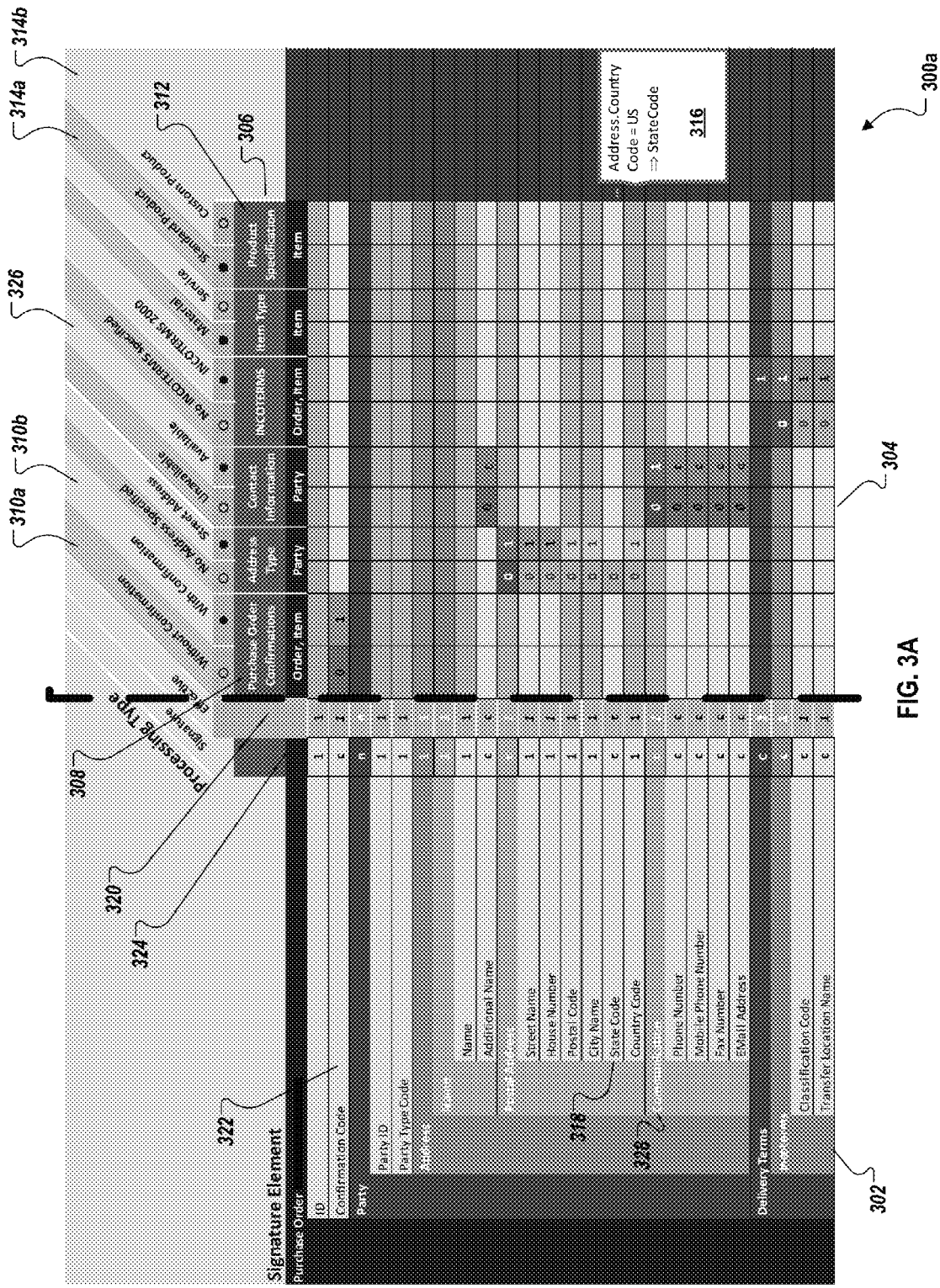

FIGS. 3A-3B illustrate an example contract signature and constraints 300 for the Order operation of FIGS. 1B and 2 according to one implementation. The example contract signature and constraints are represented in one possible implementation of a GUI of a documentation tool. 302 represents a contract signature for the "Order" operation. 304 represents a grid of constraints associated with the element of the Order operation. Six processing domains 306 are represented (here, "Purchase Order Confirmation," "Address Type," "Contact Information," "INCOTERMS," "Item Type," and "Product Specification"). In some implementations, individual processing domains can be set active/inactive. For processing domain 308, "Purchase Order Confirmation," associated processing types 310a/310b ("With Confirmation" and "Without Confirmation" respectively) are illustrated. For processing domain 312, "Product Specification," associated processing types 314a/314b ("Standard Product" and "Custom Product" respectively) are illustrated. In some implementations, the processing types on the left are by definition default processing type values. In some implementations, individual processing types can be set active/inactive. Each element in the constraint grid 304 makes a statement as to how a certain processing type affects a specific signature element of signature 302. Where no indication is made in the constraint grid 304, there is no variability that can be constrained for a particular processing type 306.

In some implementations, the "radio" type selection boxes underneath each processing type are selectable and affect a preview of processing types, the effective signature, etc. Here, each selected value affects the preview of effective signature values. For example, for the "Confirmation Code" signature element 322, if running without confirmation, the Confirmation Code 322 has a cardinality of "0" meaning it is not part of the signature and will not be included in an agreed upon signature between parties. Likewise if running with confirmation, Confirmation Code 322 has a cardinality of "1" meaning it is part of the signature (mandatory) and will be included in an agreed upon signature between parties. Note that in this case, the Signature 324 has a cardinality of "c" meaning that Confirmation Code 322 may or may not be included in the signature due to the mutually exclusive nature of the "Purchase Order Confirmations" 308 domain type and associated processing types 310a/310b. A cardinality of "c" is weak. Note that the mutually exclusive nature of the processing types 310a/310b creates two specific use cases and associated signatures. One signature with the element (mandatory to include it) and one without the element at all (must not include it). The signature 324 is a conceptual signature definition that allows the generation of many technical signature definitions. Because the with confirmation processing type 310b is selected (the non-default), the effective signature 320 (i.e., a technical signature) mandates that this code be included in a message between the parties. Note that the "real" effective signature at configuration time is computed invisibly based on static processing types and a more restrictive effective signature at run time is then computed invisibly based upon dynamic processing types.

"n" means can have multiple values associated with the signature element. For example, "Party" has many sub-values. Another example is the processing type "Available" 326. Since it is selected, the communication 328 signature elements are made available for entry. The "c" indicated for each means that the values can be entered or not (optional). In this example, assuming that Available 326 was added as an extension, if another party was running a contract version without the extension, the party with the extension supporting the "Available" 326 processing type could set the "Contact Information" domain type processing type to "Unavailable" (as opposed to "Available" 326) and be compatible with the other party without the extension and the communication 328 signature element fields would not even be in the signature.

Note, for the "Standard Product" 314a/"Custom Product" 314b processing types, if "Custom Product" 314b is selected, FIG. 3B illustrates at 330 that the "RequirementsSpecification ID" and "RequirementsSpecification Version ID" are mandatory as the cardinality of the higher-level hierarchical signature element "Product Requirement Specification Key" becomes "1" (thus effecting lower-level signature elements). In a case of a Standard Product, the cardinality of "Product Requirement Specification Key" is restricted to cardinality "0," i.e., the entire node is forbidden and not there. Thus its element "Requirement Specification ID" and "RequirementSpecification Version ID" disappears as well, along with their ineffectual "1" cardinality.

In some implementations, constraints cannot be expressed adequately in grid cells because they depend on multiple elements and/or processing types. In some implementations, these constraints can be defined using any suitably sophisticated editor or method to specify a more complex constraint. For example, Constraint 316 applies to the "State Code" signature element 318. This constraint reads in this example as a "State Code" data value is required in a message data structure if the "Address.CountryCode" data field (corresponding to signature element "Country Code") is equal to a value of "US."

Those of skill in the art will appreciate that the provided example contract signature and constraints is one of a multitude of possible examples and formats. The illustrated data would be provided in any suitable manner consistent with this disclosure. For example, the illustrated values would be represented in a database, flat file, or other suitable structure without departing from the scope of this disclosure. The provided example is not meant to be limiting in any way and is meant to only illustrate one of many possible methods of representing contract and/or constraint signature/constraint elements.

PI Scenarios

A PI scenario definition is a bundle of the interactions between two or more abstract parties that are required to realize a specific interface, with each interaction represented by a semantic contract. In a PI scenario definition, involved parties interact using a set of semantic contracts until a suitable contract definition is chosen for each semantic contract based on defined contract usages implemented by the parties, taking processing types/processing type domains into account. A PI scenario definition is a much simpler entity than a contract and is typically computed for display and default purposes only. It mainly consists of a list of roles, a list of contracts, and assignments which role takes on the part of which actor of these contracts in order to clarify who is supposed to provide and consume which interfaces. PI scenarios are intended as a unified way of setting up process integration. At a high-level, in some implementations, a system administrator/key user ideally selects one PI scenario definition entry from a list of available PI scenarios (or the PI scenario definition is selected based on contextual information—being on a purchase order development screen provides a context to select a purchase order PI scenario definition), assigns concrete systems to the respective roles (e.g., address data for the systems, etc.), and then obtains a configuration of all of the involved connections. At a lower level, establishing a PI scenario has a multi-step lifecycle, for example a contract development use case (e.g., develop the interface), a contract configuration use case (e.g., deploy and configure the interface), and as a contract runtime use case (e.g., use the interface to exchange messages).

Figure 4:
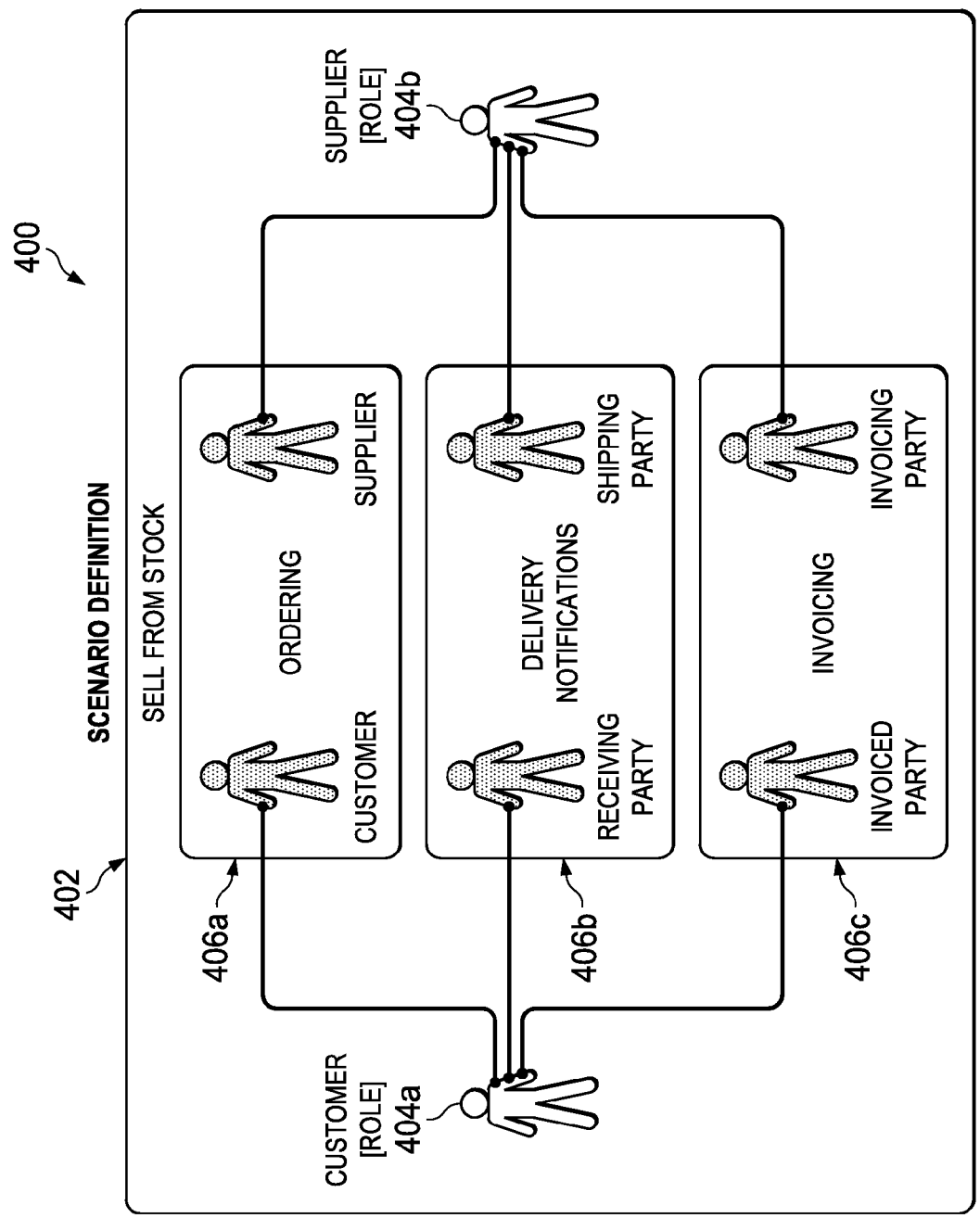
FIG. 4 is a block diagram illustrating a scenario definition.

FIG. 4 is a block diagram illustrating a scenario definition 400. The scenario definition "Sell from Stock" 402 defines roles (e.g., "Customer" 404a and "Supplier" 404b) and the semantic contracts needed for this scenario (i.e., "Ordering," 406a "Delivery Notifications," 406b and "Invoicing" 406c) each providing functionality consistent with the semantic contract's name.

Versioning

The entire structure of the model is designed in a way that supposes that there are multiple contract definitions implementing the same semantic contract, and multiple contract usages implementing the same contract definition. In this sense, there can be multiple 'versions' of contract definitions implementing the same semantics. There are no explicit versions of contracts. In some implementations, there are three types of development for a contract: 1) New development creates a new contract from scratch and is subject to no restrictions; 2) Evolutionary development (revision') is performed by the contract owner and extends or modifies an existing contract in a subsequent release; and 3) Extension development layers additional functionality on top of an existing implementation as an add-on and can be performed by anyone. In a working model without explicit versions, evolutionary and extension development adhere to the principle that every new or modified element needs to be qualified with a processing type. In this way, every new 'version' still contains the previous version, which can be extracted or enabled by simply excluding the new processing type. Therefore, later revisions are expected to be downward compatible, simply by setting the right combination of processing types. For this to work well in practice, the relevant coding should also explicitly refer to processing types. In this way, the same approach would be applied at the implementation level, i.e. the coding would be unchanged if called with the new processing types disabled.

The mechanisms for evolutionary and extension development are basically identical. The only difference is that evolutionary development performed by the contract owner happens in a linear fashion, i.e. each revision builds on and replaces the previous one, whereas multiple independent (and combinable) extensions of the same base contract can be developed and deployed at the same time, i.e. the development is 'branching out'. Therefore, evolutionary development happens in the shared contract object itself and becomes integral part of it (i.e. is made available to all systems using the contract), whereas extensions need to be stored as (addition only) deltas in extension objects that users can choose to deploy in their system or not. As the extension objects need the exact same structure as regular contracts, similar metaobject types should be reused. Extensions are marked by means of a reference to a base metaobject instance being extended.

If one party exclusively controls a particular contract definition, it could be developed locally and then made available to other interested parties. If a contract definition is defined jointly by multiple parties, it could be developed on a central/shared system and then made available in the local systems; be developed on a local system and then be made available to other local systems; or be developed in a round robin fashion, where each party takes turns to enhance the contract definition with each asynchronous release, each version building on the last previously released one.

The party chosen to define a particular contract is entirely up to the involved parties for whatever reason deemed appropriate. For example, a consumer with certified security practices can be chosen to define a contract for security reasons, or the larger/more powerful party could assert authority to do so. Ideally, contracts should be mutually agreed upon, but a dictated contract is acceptable as long as all parties agree to abide by it. For example, a new party to a contract may be required to accept the contact as-is or a government agency may dictate acceptance of a contract.

Figure 5:
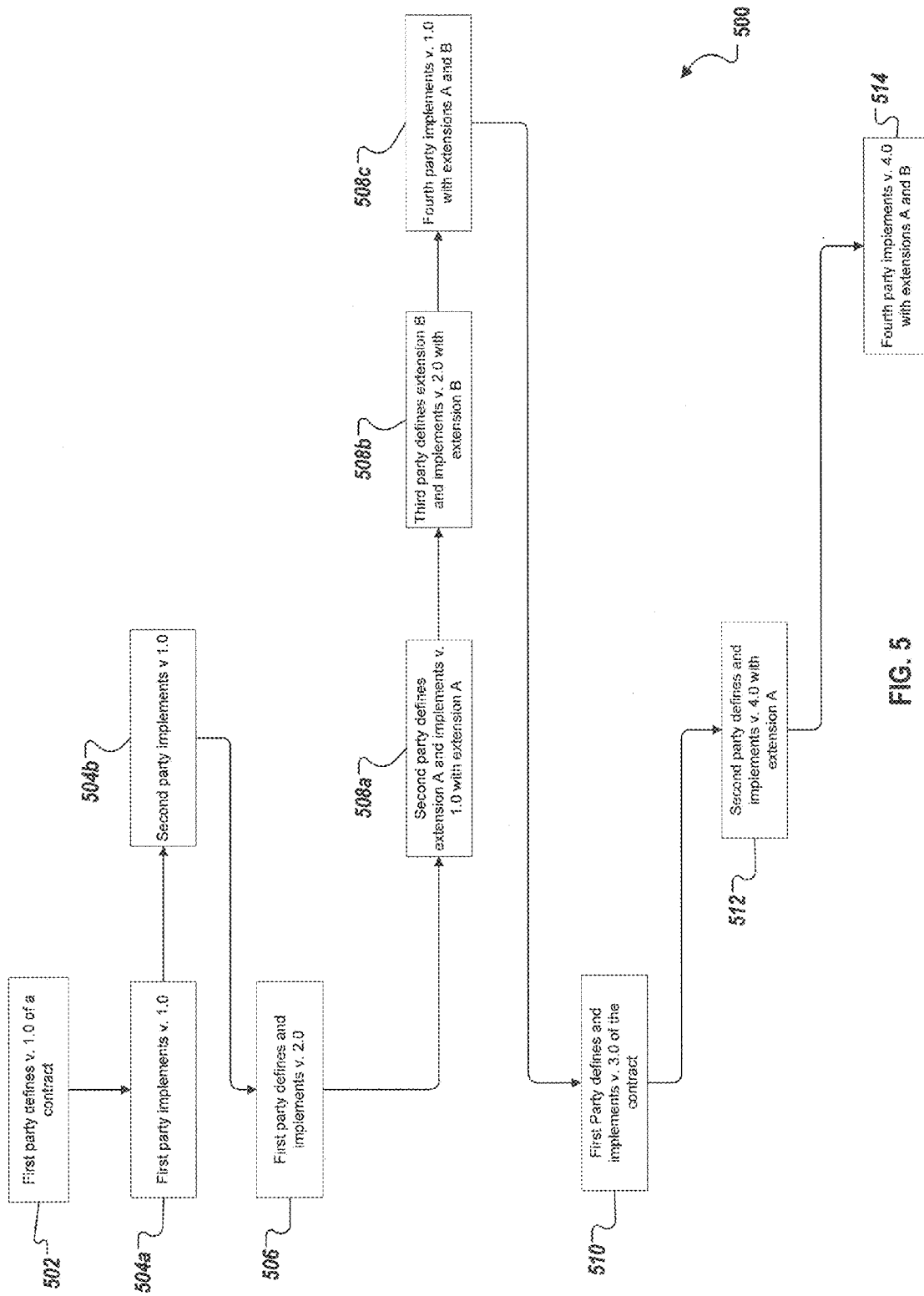
FIG. 5 is a flow chart illustrating an example method for a contract development use case according to an implementation.

FIG. 5 is a flow chart illustrating an example method 500 for a contract development use case according to one implementation. For clarity of presentation, the description that follows generally describes method 500 in the context of FIGS. 1A-1B, 2, 3A-3B, and 4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, a first party defines v. 1.0 of a contract. From 502, method 500 proceeds to 504a.

At 504a, the first party implements v. 1.0 of the contract. From 504a, method 500 proceeds to 504b.

At 504b, a second party implements v. 1.0 of the contract, respectively. Here, both the first and the second party are using the same contract version. From 504b, method 500 proceeds to 506.

At 506, the first party defines and implements v. 2.0 of the contract. From 506, method 500 proceeds to 508a and 508b.

At 508a the second party defines extension A and implements v. 1.0 with extension A. From 508a, method 500 proceeds to 508b.

At 508b, the third party defines extension B and implements v. 2.0 of the contact with extension B. From 508b, method 500 proceeds to 508c.

At 508c, a fourth party implements v. 1.0 of the contract with extensions A and B. and a third party defines and implements extensions to v. 1.0 of the contact, respectively. From 508c, method 500 proceeds to 510.

After 508a/b/c the parties are able to communicate using contracts/extensions at the levels defined in Table 5.1.

TABLE 5.1

| Party | 1 | 2 | 3 | 4 |
|---|---|---|---|---|
| 1 | 2.0 | 1.0 | 2.0 | 1.0 |
| 2 | 1.0 | 1.0 + A | 1.0 | 1.0 + A |
| 3 | 2.0 | 1.0 | 2.0 + B | 1.0 + B |
| 4 | 1.0 | 1.0 + A | 1.0 + B | 1.0 + A + B |

At 510, the first party defines and implements v. 3.0 of the contract. From 510, method 500 proceeds to 512.

At 512, the second party defines and implements v. 4.0 of the contract with extension A. Note that as illustrated different parties can develop the main version line of a contract (e.g., first party and second party) and different parties can develop extensions to the main line of the contract (e.g., the second party and the third party). Additionally, parties can share extensions and/or implemented extensions defined by other parties (e.g., fourth party). From 512, method 500 proceeds to 514.

At 514, a fourth party implements v. 4.0 of the contact defined by the second party and implements extensions A and B. Note that the fourth party never defines a contract/extension, but merely implements available contracts and extensions defined by other parties.

After 514, the parties are able to communicate using contracts/extensions at the levels defined in Table 5.2.

TABLE 5.2

| Party | 1 | 2 | 3 | 4 |
|---|---|---|---|---|
| 1 | 3.0 | 3.0 | 2.0 | 1.0 |
| 2 | 3.0 | 4.0 + A | 2.0 | 4.0 + A |
| 3 | 2.0 | 2.0 | 2.0 + B | 2.0 + B |
| 4 | 1.0 | 4.0 + A | 2.0 + B | 4.0 + A + B |

After 514, method 500 stops.

All the parties can freely contribute extensions and create implementations that are heterogeneous but all of them can interact at some minimum level of intersection between the versions and extensions. For example, if the first and second parties communicate after 504a/504b, they have full functionality available to them as they are on the same version, where the first party after 510 (v. 3.0 with no extensions) and the fourth party after 514 (v. 4.0 with extension A and B) may have some issues due to the disparate versions and/or extensions).

Those of skill in the art will appreciate that the provided example parties and contract/extension version is one of a multitude of possible example development use cases. For example, there could be many other parties or groups of parties involved than those illustrated with a myriad of possible defined contract extensions, etc. The provided example is not meant to be limiting in any way and is meant to only illustrate one of many possible development relationships between parties within the scope of this disclosure.

Figure 6:
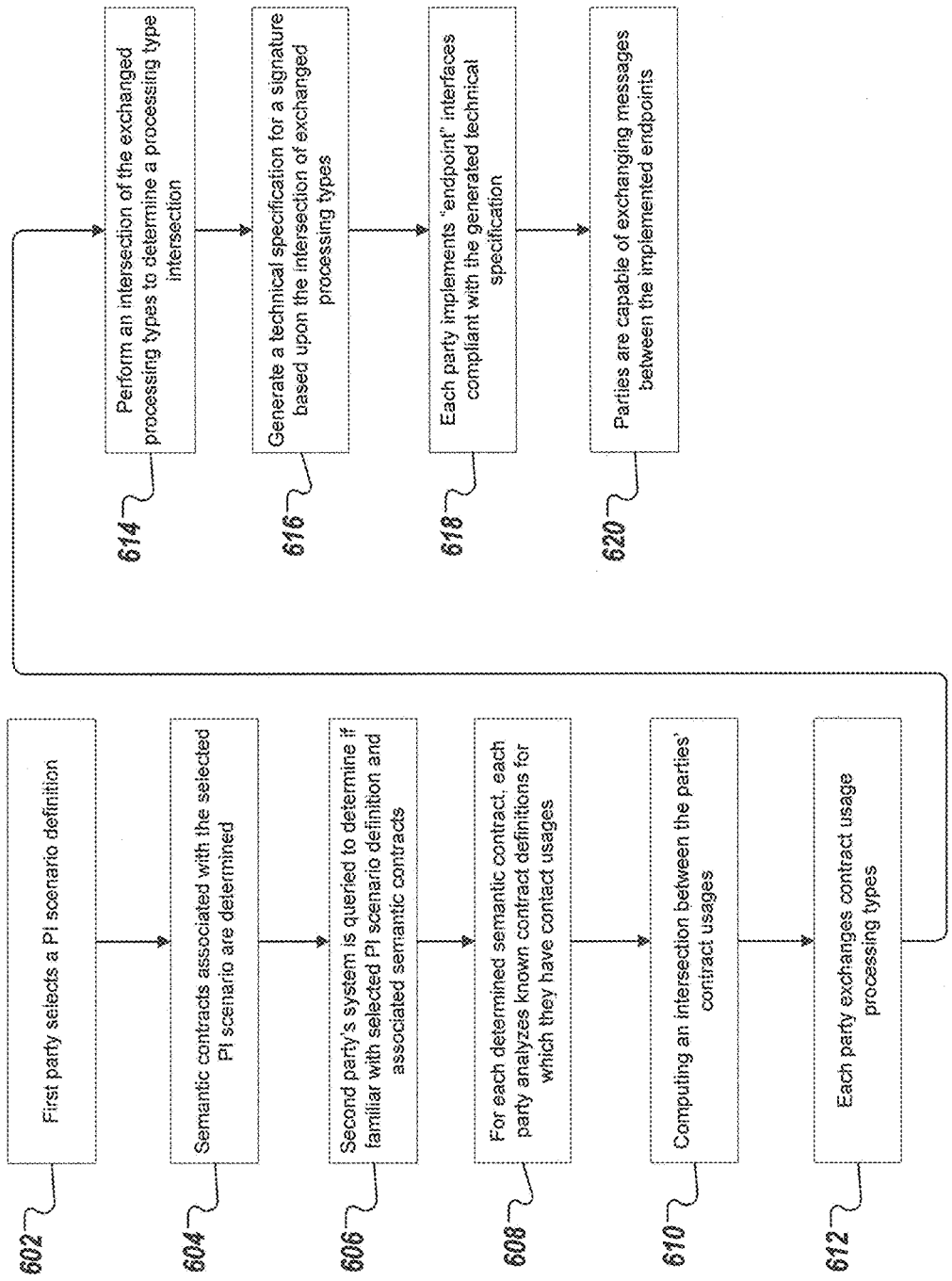
FIG. 6 is a flow chart illustrating an example method for a contract configuration use case according to an implementation.

FIG. 6 is a flow chart illustrating an example method 600 for a contract configuration use case according to one implementation. For clarity of presentation, the description that follows generally describes method 600 in the context of FIGS. 1A-1B, 2, 3A-3B, 4, and 5. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, or in any order.

At 602, a first party user accessing a development system selects a PI scenario definition. For example, the user can manually select a purchase order PI scenario from a catalog or the development system can contextually select a purchase order PI scenario for the user because they are on a "purchase order" screen or in a "purchase order" development area within the development system. The user also selects/inputs system address information/record for another desired second party that is wished to be communicated with using contract-based technology. For example, the address information could be an internet protocol (IP) address, URL, URI, or any other suitable system address information/record. From 602, method 600 proceeds to 604.

At 604, a communication framework (not illustrated in FIG. 4) determines semantic contracts associated with the selected PI scenario definition. Referring to FIG. 6, an example would be that the communication framework would select the "Ordering," 606a "Delivery Notifications," 606b and "Invoicing" 606c semantic contracts if the user selected the "Sell from Stock" 602 semantic contract. The communication framework can be any software, module, process, or the like that can process contract-based technology as described within this disclosure and consistent with aspects of this disclosure. From 604, method 600 proceeds to 606.

At 606, the other party's system is queried (e.g., over a commonly understood communication interface) to determine if the other system is familiar with the selected appropriate PI scenario definition and associated semantic contracts. The other party's system responds that it is aware of the target PI scenario definition and semantic contracts. From 606, method 600 proceeds to 608.

At 608, each party analyzes known contract definitions for which they have contact usages (i.e., the contracts are implemented) for each semantic contract. Note that if a party does not have a contact implemented, this can mean that the use of contracts may not be feasible at that time between the two parties. Of course, the non-implementing party could implement the contact as well. Each party identifies to the other their contract usage. For example, a first party may implement the contract definition using technology A and a second party may implement a contract definition on technology B. From 608, method 600 proceeds to 610.

At 610, an "intersection" between the two party's contract usages is computed. In some implementations, this intersection computation can be performed by one or both parties. The highest compatibility intersection is normally selected for use between the two parties. Parties can indicate an order of preference for the contract definitions they have implemented; typically ranking the most capable implementation they have as the highest ranking. For the chosen contract definition, the parties will then select the latest, most capable variant supported by both parties. From 610, method 600 proceeds to 612.

At 612, each party exchanges contract usage processing types with the other party. From 612, method 600 proceeds to 614.

At 614, an intersection of the exchanged processing types is performed to arrive at an agreed upon set of processing types. For example, one party may support processing without confirmation while the other will support both with/without confirmation. In this case, the intersection would be for both to support without confirmation. The intersection is without confirmation and both will run in this mode. This intersection can result in the disabling of interface operations as well as modification of protocols to not require confirmation. Note, in some implementations, if both supported with/without confirmation, the default would be to select with confirmation as it is the most advanced/functional option. From 614, method 600 proceeds to 616.

At 616, a technical specification is generated for a signature based upon the intersection of the exchanged processing types. In some implementations, a tool can be provided to work with say a data structure illustrated in FIGS. 3A-3B. In some implementations, the signatures are exchanged using Web Service Definition Language (WSDL) specifications or other suitable specifications. From 616, method 600 proceeds to 618.

At 618, each party implements interfaces that are compliant to the agreed upon technical specification are established by each party. Each implemented interface is an "endpoint" that conforms to the generated technical specification and can receive/transmit messages between the parties. Note that messages transmitted between the parties may have ambiguities in terms of optional signature elements that will be resolved at runtime (see FIG. 8). For example, constraints related to processing types are not written into the technical signature. Affected signature elements are marked as option in the technical signature. In reality, there are two mutually exclusive subsets of signature elements, one for each processing type. At runtime, depending on the active processing type, one subset has a cardinality of "0" (typically meaning not active) while the other as a cardinality of "1" (typically indicating active), and vice versa if the other processing type is active. From 618, method 600 proceeds to 620.

At 620, now that the parties have set up endpoints, signatures have been exchanged, processing types have been locked in so message fields are known/expected, the parties are capable of exchanging messages using implemented endpoint interfaces. The configuration use case is complete. From 620, method 600 stops.

Figure 7:
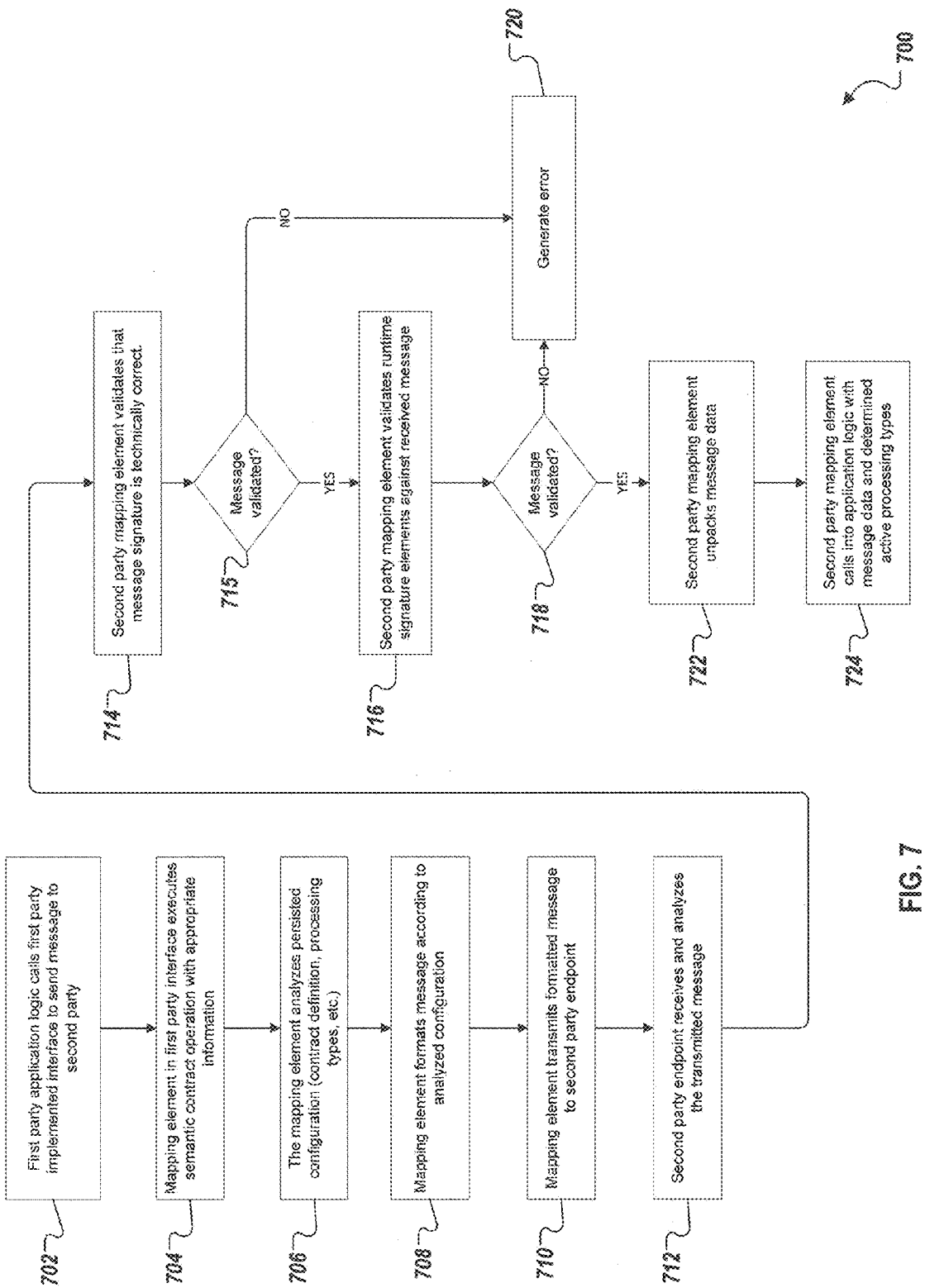
FIG. 7 is a flow chart illustrating an example method for a contract runtime use case according to an implementation.

FIG. 7 is a flow chart illustrating an example method 700 for a contract runtime use case according to one implementation. For clarity of presentation, the description that follows generally describes method 700 in the context of FIGS. 1A-1B, 2, 3A-3B, 4, 5, and 6. However, it will be understood that method 700 may be performed, for example, by any other suitable system, environment, software, and hardware, or a combination of systems, environments, software, and hardware as appropriate. In some implementations, various steps of method 700 can be run in parallel, in combination, in loops, or in any order.

At 702, first party application logic decides that a message needs to be sent and calls an implemented interface. For example, a purchase order needs to be transmitted to a second party. From 702, method 700 proceeds to 704.

At 704, a mapping element associated with the implemented interface executes an appropriate semantic contract operation, for example an "Order" operation, with appropriate information. The mapping element executes the operation by supplying, for example, operation ("Order"), party (address record), and a handle/pointer/call-back address back into the application logic for appropriate purchase order data (internal purchase order document). From 704, method 700 proceeds to 706.

At 706, mapping element analyzes a persisted configuration according to the specified party. The configuration can include contract definition, processing types, constraints, etc. From 706, method 700 proceeds to 708.

At 708, the mapping element formats the message according to the analyzed persisted configuration and data retrieved from the handle back into the application logic. In some implementations, the mapping element can perform/request a validation of the formatted message prior to transmission. From 708, method 700 proceeds to 710.

At 710, the mapping element transmits the formatted message to a second party endpoint. From 710, method 700 proceeds to 712.

At 712, a second party endpoint associated with the second party endpoint received and analyzes the transmitted message. From 712, method 700 proceeds to 714.

At 714, the second party mapping element validates that the signature is correct (i.e., required signature elements/data is present). From 714 method 700 proceeds to 715.

At 715 a determination is made whether the signature validation has passed. If not passed, method 700 proceeds to 720 where an error is generated and transmitted to the first party. If passed, method 700 proceeds to 726.

At 716, the second party mapping element validates that the runtime constraints associated with the message are valid (i.e., according to the effective signature). For example, the item type in the message can be analyzed. If a "Custom Product" processing type is applicable, the additional constraints can be analyzed for the inclusion of mandatory signature elements. At the technical level (714) these constraints appear optional so they cannot be checked at that stage. From 716, method 700 proceeds to 718.

At 718 a determination is made whether the signature validation has passed. If not passed, method 700 proceeds to 720 where an error is generated and transmitted to the first party. If passed, method 700 proceeds to 722.

At 722, the second party mapping element unpacks the message. From 722, method 700 proceeds to 724.

At 724, the second party mapping element calls into application logic to write unpacked message data, determined active processing types (e.g., standard vs. custom product), constraints, and other suitable data. To send a message from the second party to the first party, 702-724 can be executed starting from the second party application logic. From 724, method 700 stops.

Figure 8:
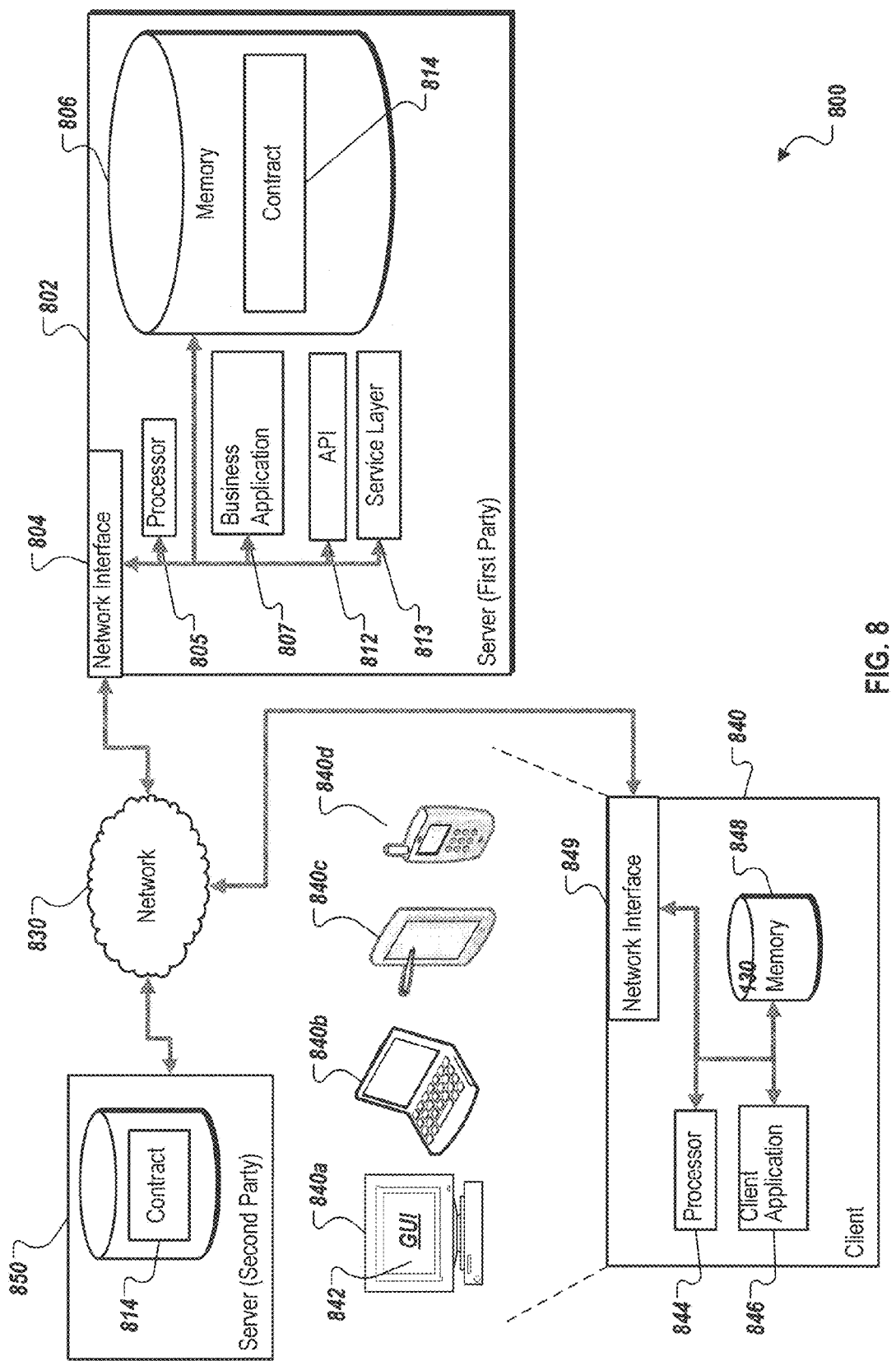
FIG. 8 is a block diagram illustrating an example distributed computing system for providing contract-based process integration according to an implementation.

FIG. 8 is a block diagram illustrating an example distributed computing system for providing contract-based process integration according to one implementation. The illustrated example distributed computing system 800 includes or is communicably coupled with a server 802, a client 840, and server 850 that communicate across a network 830 (described below). At a high level, the server 802 is an electronic computing device operable to receive, transmit, process, store, or manage data and information associated with the example distributed computing system 800. According to some implementations, server 802 may also include or be communicably coupled with an e-mail server, a web server, a caching server, a streaming data server, and/or other suitable server. The following described computer-implemented methods, computer-readable media, computer systems, and components of the example distributed computer system 800 provide functionality through one or more graphical user interfaces (GUIs) providing an efficient and user-friendly presentation of data provided by or communicated within the example distributed computing system 800. In some implementations, server 850 can be similar to server 802 as described below. In other implementations, server 850 can be different than server 802. Regardless of a level of similarity between server 850 and server 802, the server (second party) 850 needs to at least be capable of executing software and/or hardware necessary to transmit data in conformity to an agreed upon contract as described above to a first party using server 802, where there agreed upon contract is between the first party and the second party. In some implementations, server 850 can contain some or all of the components of server 802 as described below and the components can operate on server 850 similarly or differently than the components described in relation to server 802.

In general, the server 802 is a server that stores one or more business applications 807, where at least a portion of the business applications 807 are executed using requests and responses sent by clients 840 within and communicably coupled to the illustrated example distributed computing system 800. In some implementations, the server 802 may store a plurality of various business applications 807. In other implementations, the server 802 may be a dedicated server meant to store and execute only a single business application 807. In some implementations, the server 802 may comprise a web server, where the business applications 807 represent one or more web-based applications accessed and executed by the client 840 using the network 830 or directly at the server 802 to perform the programmed tasks or operations of the business application 807. In some implementations, the server 802 allows a user to access process definition (not illustrated) and/or process instance data (not illustrated) about business processes associated with and executing in conjunction with a particular business application 807. In some implementations, server 802, server 850, and/or other component of the example distributed computing system 800 provides various tools (not illustrated) for the first and/or second party to generate, store, edit, transmit, and/or delete contracts and associated data consistent with this disclosure. In some implementations, server 802 can be used to generate, store, edit, transmit, and/or delete contracts and associated data consistent with this disclosure for server 850 (and vice versa).

The server 802 is responsible for receiving requests using the network 830 from one or more client applications 846 (described below) associated with the client 840 of the example distributed computing system 800 and responding to the received requests by processing said requests in one or more business applications 807. In addition to requests from the client 840, requests may also be sent to the server 802 from internal users, external or third-parties, other automated applications, as well as any other appropriate entities, individuals, systems, or computers.

In some implementations, the business application 107 can provide GUI interfaces or interface with one or more other components of the example distributed computing system 800 to provide GUI interfaces that assist with the provision of contract-based (PI). For example, a purchase order issued by business application 807 of server 802 can be entered and submitted to server 850 across network 830 using a GUI interface. When processed by server 850, an GUI interface associated with a corresponding business application could be used to process a sales order and result in a returned HTML or other formatted document renderable by a client application, for example a web browser.

In some implementations, requests/responses can be sent directly to server 802/850 from a user accessing server 802/850 directly. In some implementations, the server 802/850 may comprise a web server, where one or more of the components of server 802/850 represent web-based applications accessed and executed by the client 840 using the network 830 or directly at the server 802/850 to perform the programmed tasks or operations of the various components of server 802/850.

In some implementations, any and/or all components of the server 802/850, both hardware and/or software, may interface with each other and/or the interface using an application programming interface (API) 812 and/or a service layer 813. The API 812 may include specifications for routines, data structures, and object classes. The API 812 may be either computer-language independent or dependent and refer to a complete interface, a single function, or even a set of APIs. The service layer 813 provides software services to the example distributed computing system 800. The functionality of the server 802/850 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or other suitable format.

While illustrated as an integrated component of the server 802 in the example distributed computing system 800, alternative implementations may illustrate the API 812 and/or the service layer 813 as stand-alone components in relation to other components of the example distributed computing system 800. Moreover, any or all parts of the API 812 and/or the service layer 813 may be implemented as child or sub-modules of another software module, enterprise application, or hardware module without departing from the scope of this disclosure.

The server 802 includes a network interface 804. Although illustrated as a single network interface 804 in FIG. 1, two or more network interfaces 804 may be used according to particular needs, desires, or particular implementations of the example distributed computing system 800. The network interface 804 is used by the server 802 for communicating with other systems in a distributed environment—including within the example distributed computing system 800—connected to the network 830; for example, the client 840 and server 850 as well as other systems communicably coupled to the network 830. Generally, the network interface 804 comprises logic encoded in software and/or hardware in a suitable combination and operable to communicate with the network 830. More specifically, the network interface 804 may comprise software supporting one or more communication protocols associated with communications such that the network 830 or interface's hardware is operable to communicate physical signals within and outside of the illustrated example distributed computing system 800.

The server 802 includes a processor 805. Although illustrated as a single processor 805 in FIG. 8, two or more processors may be used according to particular needs, desires, or particular implementations of the example distributed computing system 800. Generally, the processor 805 executes instructions and manipulates data to perform the operations of the server 802. Specifically, the processor 805 executes the functionality required to provide contract-based PI.

The server 802 also includes a memory 806 that holds data for the server 802, client 840, and/or other components of the example distributed computing system 800. Although illustrated as a single memory 806 in FIG. 8, two or more memories may be used according to particular needs, desires, or particular implementations of the example distributed computing system 800. While memory 806 is illustrated as an integral component of the server 802, in alternative implementations, memory 806 can be external to the server 802 and/or the example distributed computing system 800. In some implementations, the memory 806, includes one or more instances of a contract 814 as described above. Also illustrated is a similar contract associated with server 850 as both the first party and the second party have either an identical copy of the same contract 814 or at least different revisions of the same contact 814 with the revisions handled by processing types.

The contract 814 can be generated, stored, and/or converted from/into any suitable format or form, for example, binary, text, numerical, a database file, a flat file, or the like. In some instances the contract 814 can be referenced by and for inclusion into other suitable data. In some implementations, the contract 814 can be directly accessed by any suitable component of the example distributed computing system 800, for example the business application 807 and/or client 840. While the contract 814 is illustrated as an integral component of the memory 806, in alternative implementations, contract

814 can be external to the memory 806 and/or be separated into both an external contract 814 and an internal contract 814 as long as it is accessible using network 830. In some implementations, the contract 814 can interface with and/or act as a reference to an internal and/or external storage location and/or provide functionality to retrieve contract 814 stored in the internal and/or external storage location.

Those of skill in the art will appreciate that the provided examples with respect to a contract 814 and associated data are representative only and the contract 814 and associated data could be represented by myriad types of data in multiple ways. Other possible values associated with the contract 814 and associated data and consistent with the disclosure will be apparent to those of skill in the art and/or through analysis of the attached figures and the disclosure. The figures are not intended to be limiting in any way and only serve to illustrate possible a contract 814 and associated data in one implementation. Other contracts 814 and associated data consistent with this disclosure and the described principles are envisioned.

The business application 807 is any type of application that allows the client 840 to request, view, add, edit, delete, and/or consume content on the client 840 obtained from the server 802/850 and/or an additional content provider (not illustrated) in response to a received request from the client 840. A content provider may be, for example, applications and data on a server and/or external services, business applications, business application servers, databases, RSS feeds, document servers, web servers, streaming servers, caching servers, or other suitable content sources.

In some implementations, the business application 807 can also use business application data (not illustrated) including business objects and data, business processes, content provider locations, addresses, storage specifications, content lists, access requirements, or other suitable data. For example, for a database content provider, the business application data may include the server Internet Protocol (IP) address, URL, access permission requirements, data download speed specifications, etc. associated with the database content provider.

Once a particular business application 807 is launched, a client 840 may interactively process a task, event, or other information associated with the server 802/850. The business application 807 can be any application, program, module, process, or other software that may execute, change, delete, generate, or otherwise manage information associated with a particular client 840. For example, the business application 807 may be a portal application, a business application, and/or other suitable application consistent with this disclosure. The business application 807 can also interface with any other suitable component of the example distributed computing system 800 (illustrated or not) to wholly or partially complete a particular task. For example, the described components could process a contract 814 in a sequential, parallel, and/or other suitable manner.

Additionally, a particular business application 807 may operate in response to and in connection with at least one request received from other business applications 807, including business applications 807 or other components (e.g., software and/or hardware modules) associated with another server 802/850. In some implementations, the business application 807 can be and/or include a web browser. In some implementations, each business application 807 can represent a network-based application accessed and executed using the network 830 (e.g., through the Internet, or using at least one cloud-based service associated with the business application 807). For example, a portion of a particular business application 807 may be a web service associated with the business application 807 that is remotely called, while another portion of the business application 807 may be an interface object or agent bundled for processing at a remote client 840. Moreover, any or all of a particular business application 807 may be a child or sub-module of another software module or enterprise application (not illustrated) without departing from the scope of this disclosure. Still further, portions of the particular business application 807 may be executed or accessed by a user working directly at the server 802, as well as remotely at a corresponding client 840/server 850. In some implementations, the server 802 or any suitable component of server 802 or of the example distributed computing system 800 can execute the business application 807.

The client 840 may be any computing device operable to connect to or communicate with at least the server 802 and/or the server 850 using the network 830. In general, the client 840 comprises an electronic computing device operable to receive, transmit, process, and store any appropriate data associated with the example distributed computing system 800. The client includes a processor 844, a client application 846, a memory 848, and/or an interface 849.

The client application 846 is any type of application that allows the client 840 to navigate to/from, request, view, edit, delete, and or manipulate content on the client 840. In some implementations, the client application 846 can be and/or include a web browser. In some implementations, the client-application 846 can use parameters, metadata, and other information received at launch to access a particular set of data from the server 802 and/or the server 850. Once a particular client application 846 is launched, a user may interactively process a task, event, or other information associated with the server 802 and/or server 850. Further, although illustrated as a single client application 846, the client application 846 may be implemented as multiple client applications in the client 840. In some implementations, the client application 846 may act as a GUI interface for the business application 807 and/or other components of server 802/850 and/or other components of the example distributed computing system 800.

The network interface 849 is used by the client 840 for communicating with other computing systems in a distributed computing system environment, including within the example distributed computing system 800, using network 830. For example, the client 840 uses the interface to communicate with the server 802 and/or the server 850 as well as other systems (not illustrated) that can be communicably coupled to the network 830. The network interface 849 may be consistent with the above-described interface 804 of the enterprise server 802 or other interfaces within the example distributed computing system 800. The processor 844 may be consistent with the above-described processor 805 of the server 802 or other processors within the example distributed computing system 800. Specifically, the processor 844 executes instructions and manipulates data to perform the operations of the client 840, including the functionality required to send requests to the server 802 and/or server 850 and to receive and process responses from the server 802 and/or the external data 850. The memory 848 typically stores objects and/or data associated with the purposes of the client 840 but may also be consistent with the above-described memory 806 of the server 802 or other memories within the example distributed computing system 800, for example external data 850, but storing, for example, one or more instances of a contract 814 and associated data similar to that stored in memory 806 of server 802.

Further, the illustrated client 840 includes a GUI 842. The GUI 842 interfaces with at least a portion of the example distributed computing system 800 for any suitable purpose, including generating a visual representation of a web browser. The GUI 842 may be used to view and navigate various web pages located both internally and externally to the server 802, view data associated with the server 802 and/or external data 850, or any other suitable purpose. In particular, the GUI 842 may be used in conjunction with content from server 802 and/or external data 850 to provide contract-based process integration.

There may be any number of clients 840 associated with, or external to, the example distributed computing system 800. For example, while the illustrated example distributed computing system 800 includes one client 840 communicably coupled to the server 802 and server 850 using network 830, alternative implementations of the example distributed computing system 800 may include any number of clients 840 suitable to the purposes of the example distributed computing system 800. Additionally, there may also be one or more additional clients 840 external to the illustrated portion of the example distributed computing system 800 that are capable of interacting with the example distributed computing system 800 using the network 830. Further, the term "client" and "user" may be used interchangeably as appropriate without departing from the scope of this disclosure. Moreover, while the client 840 is described in terms of being used by a single user, this disclosure contemplates that many users may use one computer, or that one user may use multiple computers.

The illustrated client 840 is intended to encompass any computing device such as a desktop computer, laptop/notebook computer, wireless data port, smart phone, personal data assistant (PDA), tablet computing device, one or more processors within these devices, or any other suitable processing device. For example, the client 840 may comprise a computer that includes an input device, such as a keypad, touch screen, or other device that can accept user information, and an output device that conveys information associated with the operation of the server 802 or the client 840 itself, including digital data, visual and/or audio information, or a GUI 842, as shown with respect to the client 840.

The previous figures and disclosure illustrate and describe various aspects of computer-implemented methods, computer-readable media, and computer systems for providing contract-based process integration. While the disclosure discusses the processes in relation to an ordering contract, as will be apparent to one of skill in the art, the described computer-implemented methods, computer-readable media, and computer systems can also be applied to any type of contract of less or greater complexity, topic, etc. The description is not meant to limit the applicability of the disclosure in any way.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDFLOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   selecting a process integration (PI) scenario definition and a desired party with which to establish communication using an interface;
   determining at least one semantic contract associated with the selected PI scenario definition, wherein the at least one semantic contract specifies one or more related message interfaces with particular operations and signatures that are provided or consumed in an interaction between computing parties along with additional constraints, wherein the interaction is described by means of a set of operations, clustered into interfaces with a single shared interface definition between the computing parties, wherein the definition introduces detailed constraints requiring an explicit definition of valid uses of the interaction, and wherein, for each particular interaction, one definition of the interaction is established as binding on each computing party and forms a basis for a single data model of an interface for the particular interaction;
   querying the desired party to determine familiarity with the selected PI scenario definition and the at least one semantic contract;
   analyzing known contract definitions with contract usages for each determined semantic contract to generate first party analysis results;
   computing an intersection between the first party analysis results and corresponding received analysis results received from the desired party;
   determining an agreed upon set of processing types with the desired party by performing an intersection with contract usage processing types exchanged with the desired party; and
   generating a technical specification for a message signature based upon the agreed upon set of processing types.

2. The method of claim 1, wherein the PI scenario definition can be automatically selected based on contextual data.

3. The method of claim 1, wherein determination of the at least one semantic contract is performed by a communication contract-aware communication framework.

4. The method of claim 1, further comprising receiving confirmation of awareness of the selected PI scenario definition and the at least one semantic contract from the desired party.

5. The method of claim 1, further comprising receiving an analysis of known contract definitions with contract usages for each determined semantic contract from the desired party.

6. The method of claim 1, further comprising implementing the interface compliant with the generated technical specification.

7. The method of claim 1, further comprising exchanging a message with the desired party using the implemented interface.

8. A non-transitory, computer-readable medium storing computer-readable instructions executable by a hardware computer processor to:
   select a process integration (PI) scenario definition and a desired party with which to establish communication using an interface;
   determine at least one semantic contract associated with the selected PI scenario definition, wherein the at least one semantic contract specifies one or more related message interfaces with particular operations and signatures that are provided or consumed in an interaction between computing parties along with additional constraints, wherein the interaction is described by means of a set of operations, clustered into interfaces with a single shared interface definition between the computing parties, wherein the definition introduces detailed constraints requiring an explicit definition of valid uses of the interaction, and wherein, for each particular interaction, one definition of the interaction is established as binding on each computing party and forms a basis for a single data model of an interface for the particular interaction;
   query the desired party to determine familiarity with the selected PI scenario definition and the at least one semantic contract;
   analyze known contract definitions with contract usages for each determined semantic contract to generate first party analysis results;
   compute an intersection between the first party analysis results and corresponding received analysis results received from the desired party;
   determine an agreed upon set of processing types with the desired party by performing an intersection with contract usage processing types exchanged with the desired party; and
   generate a technical specification for a message signature based upon the agreed upon set of processing types.

9. The medium of claim 8, wherein the PI scenario definition can be automatically selected based on contextual data.

10. The medium of claim 8, wherein determination of the at least one semantic contract is performed by a communication contract-aware communication framework.

11. The medium of claim 8, further comprising instructions to receive confirmation of awareness of the selected PI scenario definition and the at least one semantic contract from the desired party.

12. The medium of claim 8, further comprising instructions to receive an analysis of known contract definitions with contract usages for each determined semantic contract from the desired party.

13. The medium of claim 8, further comprising instructions to implement the interface compliant with the generated technical specification.

14. The medium of claim 8, further comprising instructions to exchange a message with the desired party using the implemented interface.

15. A computer system, comprising:
   a computer memory configured to hold at least a semantic contract; and at least one hardware computer processor interoperably coupled to the computer memory and configured to:
  select a process integration (PI) scenario definition and a desired party with which to establish communication using an interface;
  determine at least one semantic contract associated with the selected PI scenario definition, wherein the at least one semantic contract specifies one or more related message interfaces with particular operations and signatures that are provided or consumed in an interaction between computing parties along with additional constraints, wherein the interaction is described by means of a set of operations, clustered into interfaces with a single shared interface definition between the computing parties, wherein the definition introduces detailed constraints requiring an explicit definition of valid uses of the interaction, and wherein, for each particular interaction, one definition of the interaction is established as binding on each computing party and forms a basis for a single data model of an interface for the particular interaction;
  query the desired party to determine familiarity with the selected PI scenario definition and the at least one semantic contract;
  analyze known contract definitions with contract usages for each determined semantic contract to generate first party analysis results;
  compute an intersection between the first party analysis results and corresponding received analysis results received from the desired party;
  determine an agreed upon set of processing types with the desired party by performing an intersection with contract usage processing types exchanged with the desired party; and
  generate a technical specification for a message signature based upon the agreed upon set of processing types.

16. The system of claim 15, wherein the PI scenario definition can be automatically selected based on contextual data.

17. The system of claim 15, wherein determination of the at least one semantic contract is performed by a communication contract-aware communication framework.

18. The system of claim 15, further configured to receive confirmation of awareness of the selected PI scenario definition and the at least one semantic contract from the desired party.

19. The system of claim 15, further configured to receive an analysis of known contract definitions with contract usages for each determined semantic contract from the desired party.

20. The system of claim 15, further configured to implement the interface compliant with the generated technical specification.

21. The system of claim 15, further configured to exchange a message with the desired party using the implemented interface.

* * * * *